(12) United States Patent
Nakazawa et al.

(10) Patent No.: US 8,443,021 B2
(45) Date of Patent: May 14, 2013

(54) METHOD OF GENERATING RANDOM NUMBERS

(76) Inventors: Hiroshi Nakazawa, Hirakata (JP); Naoya Nakazawa, Osaka (JP)

( * ) Notice: Subject to any disclaimer, the term of this patent is extended or adjusted under 35 U.S.C. 154(b) by 678 days.

(21) Appl. No.: 12/379,964

(22) Filed: Mar. 5, 2009

(65) Prior Publication Data

US 2010/0030829 A1 Feb. 4, 2010

(30) Foreign Application Priority Data

Aug. 2, 2008 (JP) ................................. 2008-220460

(51) Int. Cl.
*G06F 1/02* (2006.01)
*G06F 7/58* (2006.01)

(52) U.S. Cl.
USPC ......................................................... 708/250

(58) Field of Classification Search ........... 708/250–256
See application file for complete search history.

(56) References Cited

U.S. PATENT DOCUMENTS

| 4,944,009 | A * | 7/1990 | Micali et al. ..................... 380/46 |
| 7,149,763 | B2 * | 12/2006 | Joye et al. ..................... 708/250 |
| 7,921,145 | B2 * | 4/2011 | Michaels ....................... 708/250 |
| 2006/0123073 | A1 * | 6/2006 | Schmidt ........................ 708/250 |
| 2009/0292752 | A1 * | 11/2009 | Schneider ..................... 708/250 |
| 2012/0290632 | A1 * | 11/2012 | Nakazawa et al. ............ 708/254 |

OTHER PUBLICATIONS

"Interim Guidelines for Determining Subject Matter Eligibility for Process Claims in View of Bilski V. Kappos," Federal Register vol. 75, No. 143 (Jul. 27, 2010), pp. 43927-43928.*
Donald E. Knuth, "The Art of Computer Programming vol. 2", Seminumerical Algorithms Third Edition, Japanese Version, First edition, Japan, Ascii Corporation, Oct. 26, 2006, pp. 1-182.
Fishman and Moore, SIAM Journal on Scientific and Statistical Computing, vol. 7(1986), pp. 24-45.
Fishman, Mathematics of Computation, vol. 54(1990), pp. 331-334.
Nakazawa and Nakazawa, Designs of uniform and independent random numbers with long period and high precision (Mar. 9-Apr. 2, 2008).
Nakazawa and Nakazawa, Designs of uniform and independent random numbers with long period and high precision (Mar. 9-Jul. 8, 2008).
Nakazawa, Coset representations of uniform and independent random number sequences (Jul. 16-Aug. 12, 2004).
Office Action from Japanese Patent Office, Jun. 8, 2010.
Nakazawa and Nakazawa (2011), N. and H. Nakazawa: *Spectral tests of primitive roots for primes up to 101027 and of multiplicative congruential random number sequences generated by pairs of primitive roots*. (Mar. 17-Nov. 8, 2011) "pairtest90revbind2.pdf" on http://www10.plala.or.jp/h-nkzw/.
Nakazawa and Nakazawa (2012a), H. and N. Nakazawa: *Spectral tests of primitive roots of primes up to 524287 and of multiplicative congruential random number sequences generated by pairs of primitive roots*. (Jan. 2-13, 2012) "pairtestnewbind.pdf" on http://www10.plala.or.jp/h-nkzw/.
Nakazawa and Nakazawa (2012b), N. and H. Nakazawa: *Expository Remarks on: Spectral tests of primitive roots of primes up to 524287 and of multiplicative congruential random number sequences generated by pairs of primitive roots*. (Feb. 26, 2012) "rm12feb26.pdf" on http://www10.plala.or.jp/h-nkzw/.

* cited by examiner

*Primary Examiner* — Chat Do
*Assistant Examiner* — Matthew Sandifer
(74) *Attorney, Agent, or Firm* — Volpe and Koenig, P.C.

(57) ABSTRACT

A method of obtaining uniform and independent random numbers is given (a) comprising two distinct odd primes $p_1$, $p_2$ that give mutually coprime integers $q_1=(p_1-1)/2$ and $q_2=(p_2-1)/2$ with different parity to form the modulus $d=p_1p_2$; (b) comprising primitive roots $z_1$, $z_2$ of primes $p_1$, $p_2$, respectively, giving congruence relations $z \equiv z_j \bmod(p_j)$ for $j=1, 2$ that determine the multiplier $z$; and (c) comprising the initial value $n$ coprime with $d=p_1p_2$. The method generates the coset sequence $n<z> = \{r_1=n, r_2, r_3, \ldots\}$ of period $T=2q_1q_2$ recursively by $r_{j+1}=zr_j \bmod(d)$ for $j=1, 2, \ldots$ in the reduced residue class group $Z^*_d$, giving $\{v_1=r_1/d, v_2=r_2/d, \ldots\}$ for output.

4 Claims, 10 Drawing Sheets

METHOD OF GENERATING RANDOM NUMBERS

BACKGROUND OF THE INVENTION

1. Field of the Invention

The present invention relates to methods of obtaining uniform and independent random numbers on computers. More specifically, said methods relate to the multiplicative congruential generator comprising 1. a positive integer d called modulus,
2. a positive integer z ($0<z<d$) called multiplier that is coprime with d, namely that shares no common prime factor with d, and
3. a positive integer n ($0<n<d$) called initial value or seed coprime with d, generating a sequence of integers $\{r_1, r_2, r_3, \ldots\}$ by recursive congruence relations $$r_1 = n,\ r_{j+1} \equiv zr_j \bmod(d),\ 0 < r_j < d,\ j=1, 2, 3, \ldots,$$

and giving an output sequence $\{v_1, v_2, v_3, \ldots\}$ of rational numbers in the interval (0,1) by $$v_j := r_j/d,\ j=1,2,3,\ldots,$$

In contrast to the prior art that takes the modulus d for an odd prime p or a power $2^i$ for a large index i, the invention selects those d comprising two odd distinct primes as the most appropriate, based on the survey of conceivable candidates of composite d. With other key specifications for the choice of said odd primes and for due restrictions on the design of the multiplier z, the invention will render forces to equip any computers and any operating systems feasibly with generators of uniform and independent random numbers with long periods and tested statistical high quality without improbable symmetry restrictions.

2. Description of the Related Art

Random number sequences on computers are required to have reproducibility and transportability for debugging simulation programs. Said reproducibility is the nature that the identical sequence of random numbers may be generated by demands of users. Said transportability refers to the generation of one and the same sequence of random numbers on transplantation to any other computers or computer languages.

Since the vast amount of random numbers needed for simulations never allows their storage in memory, the sole possible means left is some computational procedure to generate random numbers sequentially. Said requirements of reproducibility and transportability restrict the procedure to the arithmetic of integers which by nature is devoid of truncation and round-off errors on any computers and in any computer languages. Hence a uniform random number sequence on computers should exclusively be realized by some arithmetic as a sequence $\{x_1, x_2, \ldots\}$ of integers in a range [0, z) for a large but finite integer z, and should be transformed as $\{u_1 = x_1/z, u_2 = x_2/z, \ldots\}$ to the output sequence of rational numbers in the interval [0, 1) by division at every use.

For arbitrary positive integers z and T, any sequence $\{x_1, x_2, \ldots, x_T\}$ of zero or positive integers in [0, z) may be concatenated to form a base-z numeral sequence, $$x = 0 \cdot x_1 x_2 \ldots x_T x_1 x_2 \ldots x_T \ldots = x_1/z + x_2/z^2 + x_3/z^3 + \ldots$$

with period T. Being excluded of uninteresting cases that said integers $\{x_1, x_2, \ldots, x_T\}$ are all zero or all $\bar{z} := z-1$, said x is a rational number in (0, 1) and has the expression $$x = (x_1 z^{T-1} + x_2 z^{T-2} + \ldots + x_T)/(z^T - 1) = n/d,$$

where and hereafter n/d stands for an irreducible fraction with $0<n<d$. Since d divides $z^T - 1$, d and z are coprime. Any length-T sequence $\{x_1, x_2, \ldots, x_T\}$ of integers in [0, z), which may be an output of any random number generator on a computer, or a length-T sequence taken from natural or physical uniform random numbers discretized with the precision $1/z$, thus has an obvious correspondence to a period of the numeral sequence to base z, representing an irreducible fraction n/d with z and n coprime to d.

The division process of the irreducible fraction n/d with $0<n<d$ to the base z is expressed in the identity and the inequality $$r_{j+1} = zr_j - x_j d,\ 0 < r_j < d,\ j=1, 2, 3, \ldots,$$

where $\{r_1 = n, r_2, r_3, \ldots\}$ are remainders of division that never vanish since n and z are both coprime with d. Upon division by zd these give a crucial estimate found by Nakazawa (2004), $$0 < r_j/d - x_j/z = r_j/d - u_j = (r_{j+1}/d)(1/z) < 1/z,\ u_j = x_j/z,\ j=1, 2, 3, \ldots.$$

Thus, numbers $\{u_1 = x_1/z, u_2 = x_2/z, u_3 = x_3/z, \ldots\}$ in [0, 1), irrespective of whether they are created by some computational methods or obtained from any physical random numbers, are approximated from above within a uniform error bound $1/z$, by numbers of the sequence $\{v_1 = r_1/d, v_2 = r_2/d, v_3 = r_3/d, \ldots\}$ formed by remainders of the base-z division process of an irreducible fraction n/d, if the denominator d is allowed to be any positive integer to which the base z is coprime.

Nakazawa (2004)/H. Nakazawa: Coset representations of uniform and independent random number sequences I—Cosets associated with periodic sequences. (URL) http://www10.plala.or.jp/h-nkzw (04eprsq1.pdf/Jul. 16-Aug. 12, 2004).

The term $r_j$ in the sequence $\{r_1 = n, r_2, r_3, \ldots\}$ of remainders of base-z division n/d is congruent to $nz^{j-1}$ modulo d for $j=1, 2, \ldots$, with the value of $r_j$ taken in (0, d). If the modulus d is an odd prime or a large power $2^i$ of 2, the sequence $\{v_1 = r_1/d, v_2 = r_2/d, \ldots\}$ is the multiplicative congruential random numbers of the prior art generated by the multiplier z, for the initial value (or seed) n and in the modulus d. We analyze the most general form of the modulus d characterized by its factorization into prime factors $$d = p_1^{i_1} p_2^{i_2} \ldots p_s^{i_s},\ i_j \geq 1,\ 1 \leq j \leq s,$$

in order to find and exploit the optimal technological setting.

Let $d \geq 2$ be any positive integer, and denote $Z^*_d$ for the set of integers coprime to d. Equivalence or identity of elements of $Z^*_d$ is defined by the congruence modulo d; constituents of $Z^*_d$ may thus be represented by integers in the interval (0, d), which will be replaced with [0, d) for later conveniences. The set $Z^*_d$ forms a group with respect to the multiplication modulo d, and is called the reduced residue class group modulo d. The order, or the number of distinct elements, of the group $Z^*_d$ is defined to be Euler's function and denoted as $\phi(d)$. For a prime $d=p$, $Z^*_p$ consists of $\{1, 2, \ldots, p-1\}$, giving $\phi(p) = p-1$. For a power $p^i$ ($i \geq 2$) of a prime p the group $Z^*_{p^i}$ may be taken to consist of integers in the interval $[0, p^i)$ with the exclusion of multiples of p, $$0 = 0 \cdot p, 1 \cdot p, 2 \cdot p, 3 \cdot p, \ldots, (p^{i-1}-1) \cdot p,$$

totaling to $p^{i-1}$ in number. These give the following fundamental formula for any prime p:

$$\phi(p^i) = p^i - p^{i-1} = p^i(1 - 1/p),\ i \geq 1,$$

which is always even with the sole exception of $\phi(2^1)=1$. For any $z \in Z^*_d$ define the cyclic sequence $<z>$, i.e. the cyclic (sub)group generated by z denoted in sequential form $$<z>:=\{1=z^0, z^1, z^2, \ldots\} \bmod(d).$$

With all constituents taken in the interval [0, d), $<z>$ is identical to the multiplicative congruential sequence generated by the multiplier z with the modulus d and the initial value n=1. For the initial value $n \in Z^*_d$ the multiplicative congruential sequence is the coset sequence $$n<z>=\{n, nz, nz^2, \ldots\} = \{r_1, r_2, r_3, \ldots\} \bmod(d),$$

again with all constituents taken in the interval (0, d). Periods of $<z>$ and $n<z>$ are one and the same, to be denoted T. Lagrange's theorem proves that T is a divisor of the order $\phi(d)$ of $Z^*_d$. If the group $Z^*_d$ is itself cyclic and z is its generator, then $Z^*_d$ is exhausted by the sequence $<z>$ with the full period $T=\phi(d)$. Any coset $n<z>$ is then identical with $<z>$ as a periodic sequence except for the starting element n. The group $Z^*_d$ is known to be cyclic only for following cases of the modulus d:

1. d=2, 4; cases $d=2^i$, $i \geq 3$ are excluded.
2. $d=p^i$ with an odd prime p and any integer i=1, 2, ....
3. $d=2p^i$ with an odd prime p and any integer i=1, 2, ....

Case 1 is not interesting and discarded. Case 3 will find its natural treatments in the decomposition of the modulus d into prime factors.

The group $Z^*_d$ with composite modulus d formed by coprime factors acquires a significant structure regulated by Chinese remainder theorem. Fix an arbitrary integer $s \geq 2$ and take pairwise coprime integers $d_1, d_2, \ldots, d_s$. Define $d := d_1 d_2 \ldots d_s$, and $$e_j := d/d_j, \quad 1 \leq j \leq s.$$

Since $e_j$ consists of $d_k$ other than $d_j$, $d_j$ and $e_j$ are coprime. Euclidean algorithm gives integers $D_j$ and $E_j$ that yield the identity $$GCD(d_j, e_j) = 1 = d_j D_j + e_j E_j, \quad 1 \leq j \leq s.$$

Define $U_j := e_j E_j$ determined by $d_1, d_2, \ldots, d_s$. Since $e_j$ consists of $d_k$'s other than $d_j$, the above identity gives, with $\delta_{jk}$ for Kronecker's delta, $$U_j \equiv \delta_{jk} \bmod(d_k), \quad 1 \leq j, k \leq s.$$

Here and hereafter $1 \leq j$, $k \leq s$ will be used for short of $1 \leq j \leq k$ and $1 \leq k \leq s$. Take arbitrary integers $\{z_j | 1 \leq j \leq s\}$. The set of congruence relations $$z \equiv z_j \bmod(d_j), \quad 1 \leq j \leq s,$$

have a solution $z = z_1 U_1 + \ldots + z_s U_s$. If z' is another solution of the above congruence relations, then $z - z' \equiv 0 \bmod(d_j)$ holds for $1 \leq j \leq s$, implying z–z' is a common multiple of $d_1, d_2, \ldots, d_s$. Hence z–z' is divisible by their least common multiple d, proving that the solution of simultaneous congruence relations is unique modulo d with the form $$z = z_1 U_1 + z_2 U_2 + \ldots + z_s U_s \bmod(d = d_1 d_2 \ldots d_s)$$

for integers $U_1, U_2, \ldots, U_s$ determined by $d_1, d_2, \ldots, d_s$. Since this is a congruence relation modulo d, integers $U_1, U_2, \ldots, U_s$ may be replaced with any set of integers equivalent to them modulo d. This is a form of the Chinese remainder theorem that holds true for any number s=2, 3, ... of coprime factors.

Let again $d_1, d_2, \ldots, d_s$ be pairwise coprime positive integers for any $s \geq 2$, and set $d = d_1 d_2 \ldots d_s$. Any element $z \in Z^*_d$ is coprime to any of $d_1, d_2, \ldots, d_s$, so that there is an element $z_j \in Z^*_{d_j}$ giving $z \equiv z_j \bmod(d_j)$ for each j, $1 \leq j \leq s$. Chinese remainder theorem thus proves that this element z taken arbitrarily in $Z^*_d$ has the expression $$z = z_1 U_1 + \ldots + z_s U_s \bmod(d = d_1 d_2 \ldots d_s),$$

or that any $z \in Z^*_d$ corresponds to a unique set $(z_1, z_2, \ldots, z_s)$ which is an element of the product set $Z^*_{d_1} \times Z^*_{d_2} \times \ldots \times Z^*_{d_s}$. Conversely, any set of integers $$(z_1, z_2, \ldots, z_s) \in Z^*_{d_1} \times Z^*_{d_2} \times \ldots \times Z^*_{d_s},$$

corresponds to simultaneous congruence relations $$z \equiv z_k \in Z^*_{d_k} \bmod(d_k), \quad 1 \leq k \leq s,$$

which determine an element $z \in Z^*_{d_1 d_2 \ldots d_s}$ in the form $z = z_1 U_1 + z_2 U_2 + \ldots + z_s U_s \bmod(d)$ uniquely modulo $d = d_1 d_2 \ldots d_s$ by Chinese remainder theorem. These establish the one to one correspondence between all elements of $Z^*_{d_1 d_2 \ldots d_s}$ and all elements of the product set $Z^*_{d_1} \times Z^*_{d_2} \times \ldots \times Z^*_{d_s}$. Counting elements in two sets, the multiplicative formula of Euler's function for pairwise coprime integers $d_1, d_2, \ldots, d_s$ is obtained:

$$\phi(d_1 d_2 \ldots d_s) = \phi(d_1) \phi(d_2) \ldots \phi(d_s).$$

As already noted, a composite modulus d for the group $Z^*_d$ must not include any power $2^i$ ($i \geq 2$) of 2 in order for $<z>$ and $n<z>$ in $Z^*_d$ to realize uncorrelated sequences of random numbers. See Nakazawa and Nakazawa (2008a,b) for this discovery; Detailed Description of the Invention also gives related inferences with FIGS. 7A and 7B. Therefore, the most general form of a modulus d relevant to uniform and independent random number problems is summarized in the decompositon to prime factors as $$d = d_0 d_1 d_2 \ldots d_s, \quad s \geq 1, \quad d_k = p_k^{i_k}, \quad i_k \geq 1, \quad 1 \leq k \leq s.$$

Here $p_1, p_2, \ldots, p_s$ are distinct odd primes, and $d_0$ is either $2^0 = 1$ or $2^1 = 2$. The reduced residue class group $Z^*_2 = \{1\}$ is a trivial group and $\phi(2)=1$. The multiplicative formula of Euler's function gives the order of the group $Z^*_d$ for the above noted modulus d as $$\phi(d) = \phi(p_1^{i_1} p_2^{i_2} \ldots p_s^{i_s}) = \{p_1^{i_1-1}(p_1-1)\} \{p_2^{i_2-1}(p_2-1)\} \ldots \{p_s^{i_s-1}(p_s-1)\},$$

for all cases of our interest.

Nakazawa and Nakazawa (2008a)/H. Nakazawa and N. Nakazawa: Designs of uniform and independent random numbers with long period and high precision—Control of the sequential geometry through product group structures and lattice configurations—. (URL) http://www10.plala.orjp/h-nkzw (03090403.pdf/Mar. 9-Apr. 2, 2008).

Nakazawa and Nakazawa (2008b)/H. Nakazawa and N. Nakazawa: Designs of uniform and independent random numbers with long period and high precision—Control of the sequential geometry through product group structures and lattice configurations—(URL) http://www10.plala.or.jp/h-nkzw (3978erv.pdf/Mar. 9-Jul. 8, 2008).

Two or more odd prime factors in the composite modulus d introduce into the group $Z^*_d$ new structures that are absent in moduluses formed by a single prime or by its power. Take for $s \geq 2$ the modulus $d = d_1 d_2 \ldots d_s$ with pairwise coprime positive integers $d_1, d_2, \ldots, d_s$, each of which is assumed to give a non-trivial group $Z^*_{d_k}$ for $1 \leq k \leq s$. Any elements z, $n \in Z^*_d$ determine corresponding elements in $Z^*_{d_k}$ by $$z \equiv z_k \bmod(d_k), \quad n \equiv n_k \bmod(d_k), \quad 1 \leq k \leq s.$$

These give simultaneous congruence relations $n z^{j-1} \equiv n_k z_k^{j-1} \bmod(d_k)$ for $1 \leq k \leq s$, which have the solution by Chinese remainder theorem in the following form:

$$n z^{j-1} \equiv n_1 z_1^{j-1} U_1 + \ldots + n_s z_s^{j-1} U_s \bmod(d = d_1 d_2 \ldots d_s),$$
$$j = 1, 2, 3, \ldots,$$

As noted, integers $U_1, U_2, \ldots, U_s$ are determined by $\{d_k | 1 \leq k \leq s\}$ and independent of $\{n_k, z_k | 1 \leq k \leq s\}$. The sequences $<z>$ or its coset $n<z>$ in $Z^*_{d_1 d_2 \ldots d_s}$ is thus a shuffling, in the sense of random number problems, of component cyclic sequences $<z_k>$ or cosets $n_k<z_k>$ for $1 \leq k \leq s$, respectively. Note that this shuffling, though misstated to be linear in Nakazawa and Nakazawa (2008a) based on the appearance of the r.h.s. of $nz^j$ noted above, is nonlinear in its essence. This is a congruence relation and the value of the l.h.s. jumps nonlinearly as the r.h.s. crosses any multiple of $d=d_1 d_2 \ldots d_s$. See Nakazawa and Nakazawa (2008b). Features of the generator with composite modulus $d=d_1 d_2 \ldots d_s$ thus stem from those in component groups $\{Z^*_{d_k} | 1 \leq k \leq s\}$. Take typically the period of the coset sequence $n<z>$, including the case $n=1$ of cyclic sequence $<z>$. The expression of $nz^{j-1}$ noted above, which is unique modulo d, proves that the period T of any coset $n<z>$ is realized if and only if all component cosets $\{n_k<z_k> | 1 \leq k \leq s\}$ resume their respective initial values simultaneously. Let $n_k<z_k>$ have the period $T_k$ for $1 \leq k \leq s$. The period T (or the order) of $<z>$ and $n<z>$ is thus given by the least common multiple, $$T = LCM(T_1, T_2, \ldots, T_s).$$

Resume the most general composite modulus d of our concern with the form $$d = d_0 d_1 d_2 \ldots d_s, \; d_0 = 1 \text{ or } 2, \; d_k = p_k^{i_k}, \; i_k \geq 1, \; 1 \leq k \leq s, \; s \geq 2$$

where $p_1, p_2, \ldots, p_s$ are distinct odd primes. We now specify the largest period attainable with this modulus. The trivial group $Z^*_2 = \{1\}$ for $d_0 = 2^1$ always has the period $T_0 = 1$ and, together with the case $d_0 = 2^0 = 1$, $Z^*_{d_0}$ is irrelevant in problems of the period. Lagrange's theorem states that the period $T_k$ of $n_k<z_k>$ for any elements $z_k, n_k \in Z^*_{p_k^{i_k}}$ is a divisor of (the order of the group $Z^*_{p_k^{i_k}}) = \phi(p_k^{i_k}) = 2 p_k^{i_k - 1} q_k, \; q_k := (p_k - 1)/2, \; 1 < k \leq s;$ note that $p_k$ is odd and $p_k - 1$ is even. Therefore, the period T of the coset sequence $n<z>$ in the group $Z^*_d$ satisfies $$T = LCM(T_0, T_1, T_2, \ldots, T_s) \leq LCM(1, 2 q_1 p_1^{i_1 - 1}, 2 q_2 p_2^{i_2 - 1}, \ldots, 2 q_s p_s^{i_s - 1}).$$

Since the group $Z^*_{p_k^{i_k}}$ is cyclic with generating elements for $1 \leq k \leq s$, the summary of related facts given below in Theorem A is now obvious Theorem A Let the modulus $\bar{d}$ be given with $s \geq 2$ and with distinct odd primes $p_1, p_2, \ldots, p_s$ as $$\bar{d} := d_0 d, \; d := d_1 d_2 \ldots d_s, \; d_k = p_k^{i_k}, \; i_k \geq 1, \; 1 \leq k \leq s,$$

where $d_0$ is either $2^0$ or $2^1$ and gives $\phi(\bar{d}) = \phi(d)$. Define integers $$q_k := (p_k - 1)/2 \geq 1, \; 1 \leq k \leq s,$$

with $\phi(d_k) = \phi(p_k^{i_k}) = 2 q_k p_k^{i_k - 1}$ for $1 \leq k \leq s$. For any elements z, n in the group $Z^*_{\bar{d}}$ the period T, which is common to the cyclic sequence $<z>$ and its coset sequence $n<z>$, is a divisor of $\phi(d)$, and fulfills inequalities $$T \leq 2 p_1^{i_1 - 1} p_2^{i_2 - 1} \ldots p_s^{i_s - 1} LCM(q_1, q_2, \ldots, q_s) \leq \phi(d)/2^{s-1}.$$

The largest possible period is $\phi(d)/2^{s-1}$. It is realized when $d_0 = 2^0 = 1$ and the following set of conditions (I) and (II$^0$) are satisfied, or when $d_0 = 2^1 = 2$ and the set of conditions (I) and (II$^1$) are satisfied:

(I) Distinct odd primes $p_1, p_2, \ldots, p_s$ are chosen so as to give pairwise coprime integers $q_1, q_2, \ldots, q_s$.

(II$^0$) For $d_0 = 2^0 = 1$ with $\bar{d} = d$ the multiplier z is defined by generating elements $z_k$ of the component group $Z^*_{d_k} = Z^*_{p_k^{i_k}}$ for $1 \leq k \leq s$ as $$z \equiv z_k \bmod(d_k), 1 \leq k \leq s$$

in the form $z \equiv z_1 U_1 + z_2 U_2 + \ldots + z_s U_s \bmod(d)$.

(II$^1$) For $d_0 = 2^1 = 2$ with $\bar{d} = 2d$ the multiplier z is likewise defined by generating elements $z_k$ of the component group $Z^*_{d_k} = Z^*_{p_k^{i_k}}$ for $1 \leq k \leq s$ as $$z \equiv 1 \bmod(2), z \equiv z_k \bmod(d_k), 1 \leq k \leq s$$

in the form $z \equiv 1 \cdot d + (d+1)(z_1 U_1 + z_2 U_2 + \ldots + z_s U_s) \bmod(\bar{d} = 2d)$.

For the multiplier z realizing the largest period, the group $Z^*_{\bar{d}}$ is divided precisely into $2^{s-1}$ portions by the cyclic sequence $<z>$ and its cosets.

The shuffling arising with moduluses formed by two or more odd prime factors induces effects reflecting structures of component groups, as is the case with periods noted in Theorem A. However, some drastic changes may also arise with the shuffling. The plot of the present invention is to make essential use of such a mechanism, which has its root in an obvious property of cyclic sequences and their cosets in reduced residue class groups.

Lemma B Let $d > 4$ be any integer, and z and n in $(0, d)$ be any elements of the group $Z^*_d$ which is not assumed to be cyclic. Denote the coset sequence $n<z>$ as, $$n<z> = \{r_1, r_2, \ldots\}, \; <r_j < d, \; r_1 = n, \; r_j \equiv n z^{j-1} \bmod(d),$$
$$j = 1, 2, \ldots,$$

If the cyclic sequence $<z>$ includes $-1 \equiv d - 1 \bmod(d)$ as an element, the order T of $n<z>$, the number of elements or the period, is even, and any halves of the coset sequence are completely correlated as follows with $q = T/2$, $$C_+ := \{r_1, r_2, \ldots, r_q\} \equiv \{n, nz, \ldots, nz^{q-1}\} \bmod(d),$$

$$C_- := \{r_{q+1}, r_{q+2}, \ldots, r_{2q}\} \equiv \{nz^q, nz^{q+1}, \ldots, nz^{2q-1}\} \equiv \{-n, -nz, \ldots, -nz^{q-1}\} \equiv -C_+ \bmod(d).$$

Corollary to Lemma B Let $d > 4$ give a cyclic group $Z^*_d$ with a generator z. Then an arbitrary integer n in $Z^*_d$ gives a coset sequence $n<z>$ sweeping all elements of $Z^*_d$, but its first and second halves $C_\pm$ are completely correlated. Therefore, $n<z>$ may be used, if at all, only for the half period $T/2 = \phi(d)/2$ for a sequence of independent random numbers.

(Proof) Let z have the order or the period T giving $z^T \equiv 1 \bmod(d)$. By the assumption of $-1 \in <z>$ there is an integer q in $1 < q < T \leq \phi(d)$ that gives $-1 \equiv z^q$, $z^{2q} \equiv 1 \bmod(d)$. Thus, $2q = T$, T is even, and the rest of Lemma B is obvious. By $-1 \equiv d - 1 \bmod(d)$ the group $Z^*_d$ invariably includes $-1$. Though a cyclic sequence $<z'>$ in $Z^*_d$ may be a proper subgroup and $-1$ need not necessarily be included in it, the assumption of Corollary gives $-1 \in Z^*_d = <z>$, proving that Lemma B holds true with $<z>$. ∎

Primitive root generators have frequently been warned that only small portions of periods should be used for random numbers. Irrespective of whether a group $Z^*_d$ is cyclic or not, its arbitrary cyclic sequence $<z>$ with $-1 \equiv z^q \bmod(d)$ should be warned similarly. We may proceed a step further to the original sequences of integers corresponding to cosets $C_\pm$, namely sequences corresponding to irreducible fractions $n/d$ and $(d-n)/d = 1 - n/d$, respectively. Numeral expressions of these fractions to base z, $$n/d = 0 \cdot x_1 x_2 \ldots x_q x_{q+1} x_{q+2} \ldots x_{2q} \ldots,$$

$$1 - n/d = 0 \cdot x_{q+1} x_{q+2} \ldots x_{2q} x_1 x_2 \ldots x_q \ldots,$$

reveal simple relations $x_j + x_{q+j} = z - 1 = \bar{z}$ for all $j = 1, 2, \ldots$, and show how the correlation between $C_+$ and $C_-$ of the cyclic sequence $<z>$ including $-1$ reflects the original structure in the sequence $\{x_1, x_2, \ldots\}$ of integers with improbable symmetry between its first and second halves.

Take for a while the simplest composite modulus $d=p_1 p_2$ formed by two odd distinct primes $p_1$ and $p_2$. The largest order of a multiplier $z$, or the largest period of $<z>$ on this modulus $d=p_1 p_2$ was shown to be $T=\phi(d)/2^{2-1}=\phi(d)/2$, which is realized if primes $p_1$, $p_2$ are so chosen as to give coprime integers $$q_1:=(p_1-1)/2, q_2:=(p_2-1)/2;$$

and if the multiplier $z \in Z^*_{p_1 p_2}$ is constructed with primitive roots $z_1$, $z_2$ of moduluses $p_1$, $p_2$, respectively. Note that the coset sequence $n_1<z_1>$ for any $n_1 \in Z^*_{p_1}$ has the excellence that the sequence sweeps almost all numbers in $[0, p_1)$, realizing a nearly perfect uniformity in one period. The matter is the same with $n_2<z_2>$. However, there is a spell of Corollary to Lemma B that each of $n_1<z_1>$ or $n_2<z_2>$ in its solitary use should be restricted to halves of their respective periods, thus spoiling their noted excellences in uniformity. It is to be admired that the shuffling that works in the composite modulus $d=p_1 p_2$, $$nz^{j-1} \equiv n_1 z_1^{j-1} U_1 + n_2 z_2^{j-1} U_2 \mod(d=p_1 p_2), j=1, 2, \ldots,$$

breaks this spell on component sequences. First, they are allowed to repeat their periods any number of times, and problems of (repeated appearances of) their correlated first and second halves are dismissed. Second, the shuffling gives chances to construct the coset $n<z>$ that is free from the similar spell. The following Theorem C, which is the heart of the present invention, clarifies this magical work of Chinese remainder theorem. This is a generalization of the result obtained in Nakazawa and Nakazawa (2008a,b).

Theorem C Let the modulus $\bar{d}$ be given with $s \geq 2$ and with powers of distinct odd primes $p_1, p_2, \ldots, p_s$ as $$\bar{d}=d_0 d, d=d_1 d_2 \ldots d_s, d_k=p_k^{i_k}, i_k \geq 1, 1 \leq k \leq s,$$

where $d_0$ is either $2^0$ or $2^1$. As in Theorem A define integers $$q_k:=(p_k-1)/2, 1 \leq k \leq s,$$

assuming that primes $p_1, p_2, \ldots, p_s$ are so given that $q_1, q_2, \ldots, q_s$ are pairwise coprime. Take likewise a generator $z_k$ in the component group $Z^*_{d_k}$ for $1 \leq k \leq s$ and construct a multiplier $z \in Z^*_d$ with congruence relations $z \equiv z_k \mod(d_k)$ for $1 \leq k \leq s$ to obtain $$z^j \equiv z_1^j U_1 + z_2^j U_2 + \ldots + z_s^j U_s \mod(d), j=1, 2, \ldots,$$

realizing the largest period $T=\phi(d)/2^{s-1}$ for $<z>$.

(I) If integers $q_1, q_2, \ldots, q_s$ consist of one even and all other odd integers, the cyclic subgroup $<z>$ does not include $-1$.

(II) If the remainder of the dichotomy holds true, i.e. if $q_1, q_2, \ldots, q_s$ are all odd, then the cyclic sequence $<z>$ includes $-1$.

(Proof) Assume the case $d_0=1$ with $\bar{d}=d$. Take a component cyclic group $Z^*_{d_k}$ ($1 \leq k \leq s$) with $d_k=p_k^{i_k}$ and its arbitrary generator $z_k$. This group contains $-1 \equiv d_k-1 \mod(d_k)$ and has the order $\phi(d_k)=p_k^{i_k-1}(p_k-1)=2q_k p_k^{i_k-1}$. Therefore, $z_k^j \equiv -1 \mod(d_k)$ arises when and only when $j$ is an odd multiple of $t_k:=\phi(d_k)/2=p_k^{i_k-1} q_k$. Since $z^j \equiv 1 \mod(d)$ occurs for the first time in $j>0$ at $j=T=\phi(d)/2^{s-1}$, we have $z^q \equiv -1 \mod(d)$ at $q=T/2$ with $$q=T/2=\phi(d)/2^s=\{\phi(d_1)/2\}\{\phi(d_2)/2\}\ldots\{\phi(d_s)/2\}=t_1 t_2 \ldots t_s.$$

There is also an expression $$z^q \equiv z_1^q U_1 + z_2^q U_2 + \ldots + z_s^q U_s \mod(d),$$

which means that $z^q \equiv -1 \mod(d)$ can arise only when $z_k^q \equiv -1 \mod(d_k)$ holds for all $1 \leq k \leq s$. Therefore, $-1 \in <z>$ is true if all of factors $$t_k=\phi(d_k)/2=p_k^{i_k-1} q_k, 1 \leq k \leq s,$$

are odd, and false if one or more of them are even. Since all of primes $p_1, p_2, \ldots, p_s$ are odd, the former corresponds to the case (II). The latter can arises only as the case (I), because $q_1, q_2, \ldots, q_s$ are restricted to be pairwise coprime. As regards the case $d_0=2$ with $\bar{d}=2d$, the largest period multiplier takes the form $$z^j \equiv 1 \cdot d + (d+1)\{z_1^j U_1 + z_2^j U_2 + \ldots + z_s^j U_s\} \mod(\bar{d}=2d);$$

here $z_k$, $U_k$ for $1 \leq k \leq s$ are those given in the preceding case $d_0=1$. Note that $d+1$ is even, and $z^j \equiv -1 \mod(2)$ holds for any $j$. Thus $z^j \equiv -1 \mod(\bar{d}=2d)$ realizes if and only if some $j$ gives $z_k^j \equiv -1 \mod(d_k)$ for every $1 \leq k \leq s$, which was proved above to be the case in (II), and not the case in (I). ∎

The conclusion of Theorem C reveals that an appropriate choice of the composite modulus $d$, namely among pairwise coprime integers $q_1, q_2, \ldots, q_s$ one is even and all others are odd, breaks the spell that a largest period multiplier $z$ is forced to generate a sequence $<z>$ whose every pair of halves are stringently tied by symmetry. It will be notable that this is accomplished magically by using component sequences $<z_k>$ under the same spell constructed on a generator $z_k$ of the group $Z^*_{p_k^{i_k}}$. Further implications of this significant comprehension will be seen below in intuitive, geometrical terms.

Spectral tests have been the most powerful tool to assess the performance of a multiplier $z$ of multiplicative congruential generators, typically with the modulus $d$ formed by an odd prime $d=p$, or by a power of 2, $d=2^i$. They remain to be an indispensable and powerful weapon to test multipliers of composite modulus generators, hence to test any random number sequences of finite length for their uniformity and independence, if they are computable at all. The inclusion of composite modulus cases, however, necessitates many reflections on structures to grasp correctly what has so far been passed unnoticed. The modulus in this paragraph is any positive integer $d>4$. The multiplier $z$ and the initial value $n$ are any elements in the group $Z^*_d$. The group $Z^*_d$ need not be cyclic, nor $z$ need be a generator. Let $l=2, 3, \ldots$ be an arbitrary integer, and let the coset sequence $n<z>$ have the period $T$. Denote $$n<z>=\{r_j \equiv n z^{j-1} \mod(d) | 0 < r_j < d, r_{j+T}=r_j, j=1, 2, 3, \ldots\},$$

which includes the case $n=1$ of cyclic (subgroup) sequence $<z>$. We take sets of $l$ consecutive numbers of $n<z>$ as $T$ points forming a sequence $$\{P_j^{(l)}=(r_j, r_{j+1}, \ldots, r_{j+l-1}) | j=1, 2, \ldots, T\},$$

in the hyper cube $C_d$ in the $l$-dimensional Euclidean space $E_l$ with sides $[0, d)$. As regards the geometry of these points, there are some crucial comprehensions that are indispensable in proceeding to full applications of spectral tests. We list their essence below.

1. The points $\{P_j^{(l)} | j=1, 2, \ldots\}$ taken from $n<z>$ in $E_l$ are in a lattice (that is, occupy a portion, not necessarily all, of lattice points of a lattice) determined by $d$, $z$ and $l$. The lattice used here agrees in definition with the one for single odd prime modulus cases in the prior art; see Detailed Description of the Invention for the definition of the lattice and its dual.
2. Spectral tests of our concern examine the configuration of lattice points in the hypercube $C_d$ of $E_l$, not the distribution of points $\{P_j^{(l)} | j=1, 2, \ldots\}$ taking their places in lattice points or seats.
3. The total number of seats in the hypercube $C_d$ is $d$, irrespective of the choice of $z \in Z^*_d$ or of the dimension $l=2, 3, \ldots$.

In more precise terms, we need to take all points in $E_l$ that have coordinates congruent modulo d to points $\{P_j^{(l)}|j=1,2,\ldots,T\}$ noted above. This is equivalent to regard $E_l$ as an l-dimensional torus with period d in all coordinates. See Nakazawa and Nakazawa (2008a,b) for plain but unabridged expositions including proofs and visual information. The total number of elements in the group $Z^*_d$ is $\phi(d)<d$. And the total number (or the period) T of elements in the coset n<z> is a divisor of $\phi(d)$ by Lagrange's theorem and $T\leq\phi(d)$ is always the case. Therefore, points in $E_l$, generated by the l-tuples of <z> or n<z> in a period T leave always vacant or unoccupied lattice points in the hypercube $C_d$. These complications cannot be examined by spectral tests. Whatever d and $z\in Z^*_d$ may be, the lattice is a definite existence, and a spectral test in $E_l$ computes the largest distance $\lambda_d^{(l)}(z)$ between neighboring (l−1) dimensional hyperplanes that contain l−1 lattice vectors with linear independence. If z, z' are multipliers for the same modulus d and $\lambda_d^{(l)}(z)<\lambda_d^{(l)}(z')$ holds true, the configuration of seats in $E_l$ arising from z is valuated better than that given by z'. See below for more intuitive meanings of this criterion. The valuation of spectral tests has distances from the desired information on the distribution of points formed by <z> or n<z> in $E_l$. It should be stressed that the excellent performance in the spectral test is an indispensable qualification for any usable multiplier z, but not sufficient. We should be prepared for the existence of blind spots of spectral tests, and should proceed with their valuations carefully, helped by other information such as group structures of cyclic sequences or by various technical know-how that is to be accumulated in practice.

In order to have a clear overview on spectral tests, resume the simplest case of an odd prime modulus d=p and its primitive root multiplier z. The number of lattice points is d=p, while the period T of <z> is the order of $Z^*_p$ given by $T=\phi(p)=p-1$. Points in $E_l$, $$\{P_j^{(l)}|j=1,2,\ldots,T\},$$

generated by l-tuples of the sequence <z> for any dimension l=2, 3, . . . , therefore, fill the lattice points almost fully, leaving only the origin vacant. Thus, the spectral test of a primitive root multiplier of an odd prime modulus gives an almost precise valuation of the geometrical distribution of points generated by one period of <z> in $E_l$. FIGS. 2 to 4 depict visible cases of l=2 in the plane $E_2$; the modulus is d=p=251; the multipliers are primitive roots z=162, 61 and 127, respectively; periodic sequences <z> and n<z> differ only in the choice of starting values and correspond to the same plot of T=250 points. The right of each plot shows points with normalized coordinates $$\{(r_j/d,r_{j+1}/d)|j=1,2,\ldots,T\}$$

within a square that indicates the range −0.05≤x, y≤1.05 in $E_2$ or xy-plane. Left plots show points with appropriately normalized coordinates $$\{(x_j/z,x_{j+1}/z)|j=1,2,\ldots,T\}$$

corresponding to quotients that arise in the division process of the irreducible fraction n/d=1/251 to bases z=162, 61 and 127, respectively for FIGS. 2, 3 and 4. See that closeness of point configurations on the left and the right of these figures are in the order of FIG. 2, FIG. 4 and FIG. 3, in proportion to respective precision 1/z=1/162, 1/127 and 1/61. All of these figures contain the same number T=p−1=250 of generated points, or d=251 lattice points including the origin. There are wide differences in distributions of these points. If the largest distance between neighboring lattice lines (i.e. neighboring lines including the same l−1=1 linearly independent, or non-zero lattice vector in the present cases in $E_2$) is larger, then the square can contain lesser number of those lattice lines, so that the density of points on the relevant lattice lines increases in inverse proportion. The lattice with the smallest value of its largest distance between neighboring lattice lines has the smallest density of points on lattice lines, realizing the most even or unbiased distribution of points. This will be seen clearly by comparing FIGS. 2-4. Our intuition that FIG. 4 is the worst and FIG. 2 is the best, as the distribution of points representing 2-tuples of numbers appearing uniformly and independently in sequence, is thus made quantitative in the spectral test as the largest distance $\lambda_d^{(2)}(z)$ of lattice lines for respective multiplier z; the smaller is $\lambda_d^{(2)}(z)$, the better is the multiplier z. Among all lattices in 2-dimension which are periodic with period 1 along coordinate axes and with d lattice points in the unit square, the triangular lattice realizes the smallest (hence the best) value of the largest distance between neighboring parallel lattice lines. However, in spectral tests with l-consecutive numbers generated by <z>, lattice vectors can have only rational components; see explicit forms of lattice vectors in terms of d, z and l given in Detailed Description of the Invention. Since the triangular lattice requires lattice vectors with irrational components, $\lambda_d^{(2)}(z)$ is invariably larger than this ideal case of the triangular lattice. The matter is the same with any other dimension l. The criterion, that the configuration is better in $E_2$-spectral test for the lattice closer to the triangular lattice, will be utilized below as a quick and useful way of comprehension.

An epoch was marked by Fishman and Moore (1986) who initiated exhaustive spectral tests that examine all primitive roots for the prime modulus $d=p=2^{31}-1$. They adopted the criterion that a primitive root multiplier z is passable if $\lambda_d^{(l)}(z)$ is within the bound a=125% of geometrically ideal cases of the lattice (similar to the triangular lattice in 2-dimension) in all of dimensions 2≤l≤6. We note the smallest value $\bar{\lambda}_d^{(l)}$, realized by the geometrically ideal case of lattices, for dimensions l=2, 3, . . . , 6 below citing Fishman and Moore (1986), but with a normalization that defines the lattice with period d in coordinates of $E_l$, which is adapted for the representation of lattice vectors with integer coordinates to be given later.

| | dimension l | | | | |
|---|---|---|---|---|---|
| | 2 | 3 | 4 | 5 | 6 |
| $\bar{\lambda}_d^{(l)}$ | $2^{-1/2}3^{1/4}d^{1/2}$ | $2^{-1/6}d^{2/3}$ | $2^{-1/4}d^{3/4}$ | $2^{-3/10}d^{4/5}$ | $2^{-1/2}3^{1/12}d^{5/6}$ |

Fishman and Moore (1986) note that, when the upper bound a for passable primitive root multiplier z was taken more loosely as a=133.3%, intractably many primitive roots passed the test, so that they tightened to a=125%, reducing the total number of successful primitive roots jumpingly to 414, viz. $7.74\times10^{-7}\% \cong 1/(1.29\times10^6)$ of the total number $\phi(2^{31}-2)=5.346\times10^8$ of primitive roots for the prime $p=2^{31}-1$. Later for another heavily used modulus of the type $d=2^i$ Fishman (1990) reported exhaustive spectral tests on relevant multipliers $z\equiv5 \mod(8)$ for $d=2^{32}$, and also gave tests on the modulus $d=2^{48}$ examining (effectively) $2^{27}$ of multipliers among $2^{45}$ total candidates, viz. $1/(2.6\times10^5)$ of relevant generators. Remembering with dearness that Cray 2 in 1991 recorded 2 giga flops and thinking over supercomputers of today, we may contend that exhaustive spectral tests for the modulus $d=2^{48}$ are now realizable to obtain the period $T=2^{46}$. Yet this period will not suffice for simulations on supercomputers today.

Fishman and Moore (1986)/G. S. Fishman and L. R. Moore: An exhaustive analysis of multiplicative congruential random number generators with modulus $2^{31}-1$. SLAM Journal on Scientific and Statistical Computing, Vol. 7 (1986), pp. 24-45.

Fishman (1990)/G. S. Fishman: Multiplicative congruential random number generators with modulus $2^\beta$: An exhaustive analysis for $\beta=32$ and a partial analysis for $\beta=48$. Mathematics of Computation, Vol. 54 (1990), pp. 331-334.

In preceding paragraphs features of spectral tests in prior art were seen by cases in which the set of points, generated by cyclic sequences and their cosets, occupy almost all of lattice points. A significant insight on the geometry of generated points, not the geometry of lattice points, are obtained from the simplest case of composite modulus $d=p_1p_2$ formed by two distinct odd primes $p_1$ and $p_2$. Structures of cyclic and coset sequences <z> and n<z> for this modulus have been analyzed in Theorems A, C. Visual information will give the quickest comprehension of implications. FIG. 5A depicts consecutive 2-tuples taken from one period of the cyclic sequence <z>, emitted by a generator embodying a simple case of the present invention, obeying prescriptions of Theorem A for the case s=2. The generator has the modulus $d=2867=47\times61$. Note that $p_1=47$ and $p_2=61$ give $$q_1=(p_1-1)/2=23; q_2=(p_2-1)/2=30,$$

which are coprime and realize the case (I) of Theorem C. Each square represents the range $-0.05 \leq x, y \leq 1.05$ again. The multiplier z is $$z=678\equiv 20U_1+7U_2 \bmod(2867)$$

where $z_1=20$ and $z_2=7$ are primitive roots of primes $p_1=47$ and $p_2=61$, respectively, both with high scores in their respective 2-dimensional spectral tests. The group $Z^*_{2867}$ has the order $\phi(2867)=\phi(47)\phi(61)=46\times60=2760$, and the period of <z> and its cosets are the largest $T=2q_1q_2=1380=2760/2$. Points on the right square represent $(r_j/d, r_{j+1}/d)$, while those on the left square show $(x_j/z, x_{j+1}/z)$ obtained from the numeral sequence of the irreducible fraction $1/d=1/2867=0.\dot{x}_1x_2\ldots\dot{x}_T$ to base $z=678$. Since $1/z$ is sufficiently small, points on the right and the left are close to each other. FIG. 5B shows FIG. 5A with added points; the right is supplemented with points from the coset—<z>, and the left is added of points from a period of base-678 numeral sequence of the irreducible fraction $-1/2867$ or $2866/2867$. Vacancies are seen in FIG. 5B to total to $p_1+p_2-1=107$ in number including the origin. Plots of FIG. 5B suggest a neat distribution of d=2867 lattice points in $E_2$ on (nearly half portions of) which points of <z> and its cosets are nested. It is again tempting to use the sequence of <z> and its coset that together show the neat uniform distribution of numbers of $Z^*_{2867}$. But the successive appearance these sequences is the occurrence of random number sequence corresponding to $1/2867$ and then the one to $2866/2867$, which is highly improbable. Any concatenated sequence, n<z> and then $-$n<z>, should be rejected as implausible. Though the vacant seats in FIG. 5B are more conspicuous than in FIG. 2 with the sole vacancy at the origin, they are distributed uniformly so to say, and are not easy to be identified in the point sets of FIG. 5A. There is also the assurance of the shuffling by Chinese remainder theorem that the elements of the group $Z^*_{2867}$ are distributed in the interval [0, 2867) without accumulation. As regards the use of the sequence <z> or $-$<z> alone in this case, no statistical dubiousness is found in the present status of understanding.

FIG. 6 shows on the right the cyclic sequence <z> for $d=2537=43\times59$ with $z=289\equiv 34U_1+13U_2 \bmod(2537)$. Here $z_1=34$ and $z_2=13$ are excellent primitive roots of $p_1=43$ and $p_2=59$, respectively. Since integers $$q_1=(p_1-1)/2=21, q_2=(p_2-1)/2=29$$

are coprime, <z> has the largest period $T=2q_1q_2=1218$, and the group $Z^*_{2537}$ is divided into two by the cyclic subgroup <z> and its coset. However, both of $q_1$ and $q_2$ are odd, and the setting falls in the case of Theorem C (II) realizing $-1\in$<z>. Thus, only one of these halves of sequences <z> and n<z> may be used as uncorrelated random numbers. This inclusion of $-1$ in <z> manifests itself in the right plot of FIG. 6 as an obvious symmetry about the center M of the unit square; such a symmetry is absent in FIG. 5A. In fact, the following general inference holds true:

Lemma D Let there be given a modulus d>4 which may be composite. Take any z, $n\in Z^*_d$ and an arbitrary integer $l\geq 1$. In the l-dimensional Euclidean space $E_l$ denote $S_l$ for the set of points with coordinates congruent modulo d to consecutive l-tuples of integers in the coset sequence n<z> in $Z^*_d$, $$S_l:=\{P_j^{(l)}\equiv(nz^j, nz^{j+1},\ldots, nz^{j+l-1}) \bmod(d) j=0,1,2,\ldots\}.$$

Let $S'_l$ and $\bar{S}_l$ be point sets in $E_l$ symmetric to $S_l$ with respect to the point $M_d=(d/2, d/2, \ldots, d/2)$ and to the origin O, respectively.

(I) If $-1\in$<z> is true, there holds $S_l=S'_l$. Namely, the point set formed by l consecutive numbers of n<z> defined modulo d is symmetric about the point $M_d$, irrespective of the choice of $n\in Z^*_d$ including the case n=1.

(II) If $-1\notin$<z> is the case, then $S_l \cap S'_l=\phi$ holds true. Namely, the point set formed by l consecutive numbers of n<z> defined modulo d is asymmetrical about the point $M_d$, irrespective of the choice of $n\in Z^*_d$ including the case n=1.

(Proof) We prove the case l=1; this will give indications of the proof for $l\geq 2$ given in Nakazawa and Nakazawa (2008a,b), where the case l=1 was not discussed. Integers of n<z> form a point set S on the line $E_1$, to be called x-axis in this proof. Since n<z> is defined modulo d the set S is invariant under d-translations. Let S' and $\bar{S}$ denote point sets on the x-axis which are symmetric to S about points x=d/2 and x=0, respectively; these are also d-translation invariant, and $\bar{S}$ may be denoted $\bar{S}=-S$. The following is obvious:

$$S'=\{-x+d|x\in S\}=\{-x|x\in S\}=\bar{S}.$$

If $-1\in$<z> holds true, then—<z> is a sequential shift of <z>, so that $\bar{S}=S$ holds as sets. Thus we obtain $S'=\bar{S}=S$. If $-1\notin$<z> is the case, then <z> is a proper subgroup of $Z^*_d$, and disjoint as a set with the coset—<z>, implying $S'\cap S=\bar{S}\cap S=\phi$.

■FIGS. 2-4 show primitive root multipliers for odd prime moduluses, and cyclic sequences <z> therein all include $-1$. Accordingly, right plots show point sets that are symmetric w.r.t. the center of the square. Similarly, FIG. 6 shows the composite modulus case with $-1$ included in <z>. The right plot is again symmetric w.r.t. the center of the square. In contrast, FIG. 5A stands for the case that <z> does not include $-1$, and its right plot shows no conceivable symmetry. Cases (I) and (II) in Lemma D give the dichotomy, so that we may state:

Corollary to Lemma D Let z be a multiplier taken in the group $Z^*_d$ of an arbitrary modulus d>4, and let $S_l$ be the set of points in $E_l$ formed by the consecutive l-tuples of a coset sequence n<z> for an arbitrary element n in $Z^*_d$. Inclusion of $-1$ in <z> is equivalent to the symmetry of $S_l$ w.r.t. the center $M_d$ of the hyper cube of sides [0, d) for any one of dimensions $l=1, 2, \ldots$.

Inclusion of −1 in <z>, or the symmetry of point sets formed by l-tuples of integers of n<z> in $E_l$, is in fact a more serious symptom than apparent symmetry of formed point sets; the second half of generated points take symmetric positions reproducing the order of appearance of their correspondents in the first half.

The present invention chooses settings of cyclic sequence <z> in the reduced residue class group $Z^*_d$ for a composite modulus d, where −1 is excluded from <z> by design. An example was shown in FIG. 5A. As another we show in FIG. 1 the result for the setting $$d=2867=47\times 61, z=1298\equiv 29U_1+17U_2 \bmod(2867),$$

where $z_1=29$ and $z_2=17$ are excellent primitive roots for $p_1=47$ and $p_2=61$. The right plot of two-dimensional spectral test shows nearly triangular lattice. Comparisons with FIG. 5A will impress us that the multiplier z=678 for FIG. 5A will also be excellent in the two-dimensional spectral test. This is in fact the case. However, there can be a large difference in higher dimensions. The following table gives results of their spectral tests for l=2, 3 as comparisons to $\overline{\lambda}_d^{(l)}$ given by geometrically ideal cases, indicating how can differences be for choices of the multiplier z.

| multiplier z | 2-nd degree score | 3-rd degree score |
| --- | --- | --- |
| z = 1298 ≡ 29$U_1$ + 17$U_2$ mod (2867) | 104.96% | 138.27% |
| z = 678 ≡ 20$U_1$ + 7$U_2$ mod (2867) | 105.67% | 196.36% |

We saw what to be seen. We make use of a group $Z^*_d$ with a composite modulus d in order to exploit the noted improvements given by the shuffling, and also to exclude −1 from the cyclic sequence <z>. The group $Z^*_d$ for any modulus d has integers in [0, d) as its elements, with vacancies that may also be said to be distributed evenly therein. We choose parameters so as for these vacancies to be small in number, and sequences <z> and n<z> will sweep as large a portion of $Z^*_d$ as possible, for uniformity and for the strength of spectral tests. Lagrange's theorem restrains that the (sub)group <z> may occupy only an integral portion of $Z^*_d$. And a composite modulus group cannot be cyclic. The largest portion that <z> can occupy in $Z^*_d$ is thus the half, and the structure of the period shown in Theorem A rules that the modulus should then comprise s=2 odd distinct primes. The factor $d_0$ of 1 or 2 in the modulus has no effect on the period and its participation in the shuffling is merely as a constant factor for $d_0=2$:

$$nz^j \equiv d+(d+1)(n_1z_1^j+n_2z_2^j+\ldots+n_sz_s^j) \bmod(2d),$$

so that we discard $d_0$ altogether. We are thus left with the form $d=d_1d_2$, with $d_1=p_1^{i_1}$ and $d_2=p_2^{i_2}$ for odd primes $p_1$ and $p_2$.

Component groups $Z^*_{p_k^{i_k}}$ for k=1, 2 have generating elements with periods $$T_k=\phi(p_k^{i_k})=p_k^{i_k}(1-1/p_k)\cong p_k^{i_k}, k=1,2.$$

For the shuffling in <z> and its coset to be effective, we require $T_1 \cong T_2 \cong t$. Then the period of <z> is $T=T_1T_2 \cong t^2$. Now the computability of spectral tests puts a practical limit on T or on $t \cong T^{1/2}$. Component moduluses $d_k = p_k^{i_k}$ (k=1, 2) should thus be determined by the requirement $$t \cong T^{1/2} \cong p_k^{i_k}, p_k \cong t^{1/i_k}, k=1,2.$$

Therefore, the ratio V of the number of voids, i.e. integers in [0, d) left unoccupied by the elements of $Z^*_d$, to the total number d of lattice points is $$V=\{d-\phi(d)\}/d=1-(1-1/p_1)(1-1/p_2)\cong 1/p_1+1/p_2 \cong t^{-1/i_1}+t^{-1/i_2}.$$

This factor for a fixed t is minimized at $i_1=i_2=1$. The best setting for our aim is thus provided by moduluses of the form $d=p_1p_2$ comprising two distinct odd primes of similar magnitudes, on the premise that we exploit the largest period setting of Theorem A.

Summarizingly, we have first to determine the computable largest period $T=t^2$. Then we choose distinct odd primes, $p_1$, $p_2 \cong t$; the choice should obey prescriptions of Theorem A and Theorem C that integers $q_1=(p_1-1)/2$ and $q_2=(p_2-1)/2$ are coprime and have different parity, one even and the other odd. The multiplier z is then formed by primitive roots $z_1$, $z_2$ of primes $p_1$, $p_2$, respectively, by congruence relations $z \equiv z_1 \bmod (p_1)$ and $z \equiv z_2 \bmod(p_2)$.

BRIEF SUMMARY OF THE INVENTION

The aim of the present invention is to provide a method to obtain uniform and independent random numbers with long periods and certified statistical quality, which may be realized on computers and their operating systems with the smallest computational cost.

The invention claims a method of obtaining uniform and independent random numbers comprising:
1. two odd primes $p_1$ and $p_2$ which are prescribed to give mutually coprime integers $$q_1:=(p_1-1)/2, q_2:=(p_2-1)/2$$

with different parity, i.e. one of $\{q_1, q_2\}$ is odd and the other is even,
2. primitive roots $z_1$ and $z_2$ of prime moduluses $p_1$ and $p_2$, respectively,
3. the modulus $d=p_1p_2$,
4. the multiplier z coprime with $d=p_1p_2$, and determined modulo d uniquely by congruence relations $$z \equiv z_1 \bmod (p_1), z \equiv z_2 \bmod(p_2),$$

in the interval (0, d), and
5. an integer n coprime with d chosen arbitrarily in the interval (0, d).

Said method constructs a coset sequence of integers for the initial value or seed n, $$n<z>=\{r_1, r_2, \ldots, r_T\}$$

of the cyclic sequence <z> of said multiplier z, which has the order $T=\phi(d)/2=2q_1q_2$ in the reduced residue class group $Z^*_d$ modulo $d=p_1p_2$, by solving the congruence relations $$r_1=n, r_{j+1} \equiv zr_j \bmod(d), 0<r_j<d, 1 \le j \le T=\phi(d)/2=2q_1q_2,$$

and gives the output sequence $\{v_1, v_2, \ldots, v_T\}$ for uniform and independent random numbers of period T by realizing the arithmetic, $$v_j=r_j/d, 0<v_j<1, 1 \le j \le T.$$

The heart of the invention is in selecting said primes $p_1$, $p_2$ that give coprime integers $q_1$, $q_2$ with different parity. This prescription expels −1 from the cyclic sequence <z> generated by said multiplier z, enabling the use of the whole sequence, obtained from <z> or its coset by normalization, for uniform and independent random numbers without recognizable correlations over the whole period.

DETAILED DESCRIPTION OF THE INVENTION

In the presented invention, the design of a generator of uniform and independent random numbers starts by choosing the period T, which will need some trials in order to find the largest magnitude of T so as for resultant spectral tests to be computable.

Figure 8:
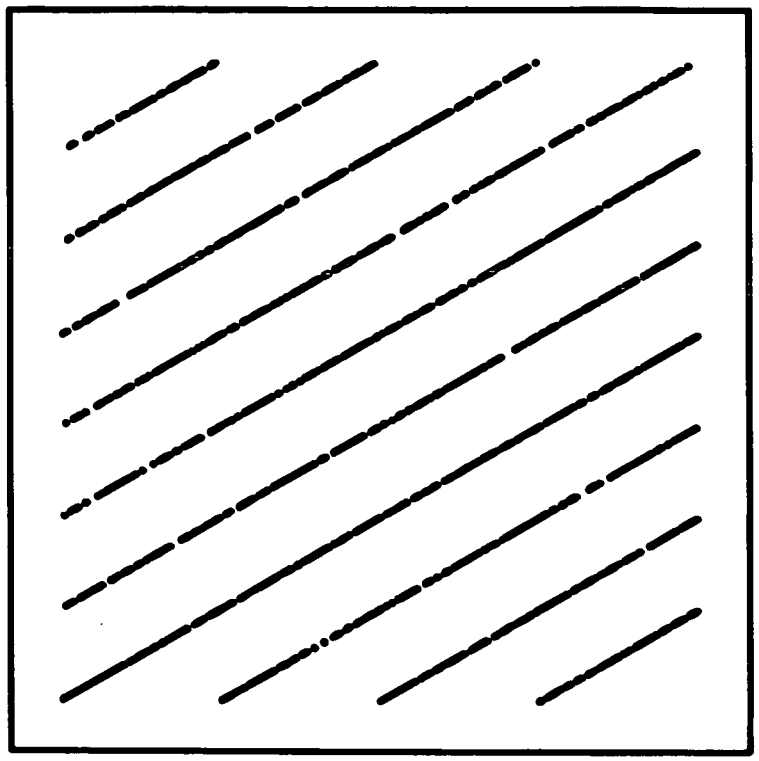
FIG. 8 shows an inadequate setting that can arise in the present invention; the composite modulus $d=3599=59\times 61$ is formed by twin primes which are too close for shuffling to be effective; $z=89\equiv 13U_1+44U_2 \bmod(3599)$ and $T=1740$.
Figure 8:
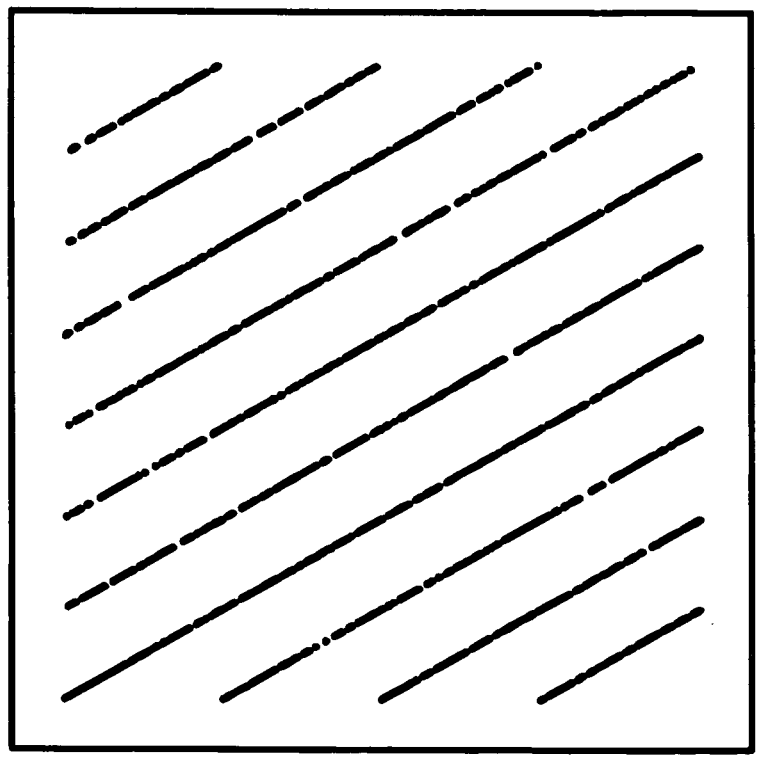

Given the period T, two odd, distinct primes $p_1$, $p_2$, for the formation of the modulus $d=p_1 p_2$, should be chosen with similar magnitude, typically of the order of $T^{1/2}$, so as to minimize the ratio to d of the number of voids, viz. the number of integers in the interval $[0, d)$ left unoccupied by the elements of the group $Z^*_{p_1 p_2}$ (i.e. multiples of $p_1$ and $p_2$ in the interval $[0, d)$ including 0), $$\{d-\phi(d)\}/d=1-(1-1/p_1)(1-1/p_2)=1/p_1+1/p_2-1,$$

under the fixed period $T=\phi(d)/2\equiv p_1 p_2/2$. There exist further indispensable restrictions in choosing primes $p_1$, $p_2$. Namely, integers $$q_1=(p_1-1)/2, \; q_2=(p_2-1)/2$$

should be coprime, and should have different parity. Caution should also be paid to prevent the excessive closeness of $p_1$ and $p_2$. FIG. 8 will give an intuitive comprehension in this regard. Here the choice is twin primes $p_1=59$ and $p_2=61$ for the modulus $d=3599=59\times 61$, together with the multiplier $z=89\equiv 13U_1+44U_2 \bmod(3599)$ formed with excellent primitive roots $z_1=13$ for $p_1=59$ and $z_2=44$ of $p_2=61$. Component cyclic sequences $<13>\bmod(59)$ and $<44>\bmod(61)$ have too close periods $T_1=58$ and $T_2=60$, and the shuffling mechanism between them does not work well. Or the shuffling (or rather mixing) in this case introduces new correlations similar to beat phenomena in sound. The right of FIG. 8 shows poor performance of consecutive 2-tuples taken from $<z>$, together with the left plot of corresponding consecutive 2-tuples of numerals (divided by $z$ for normalization) arising in the division process of $1/d=1/3599$ to base $z$. By the way, $q_1=29$ and $q_2=30$ are different in parity, but this virtue is made invalid by the closeness of periods.

Figure 1:
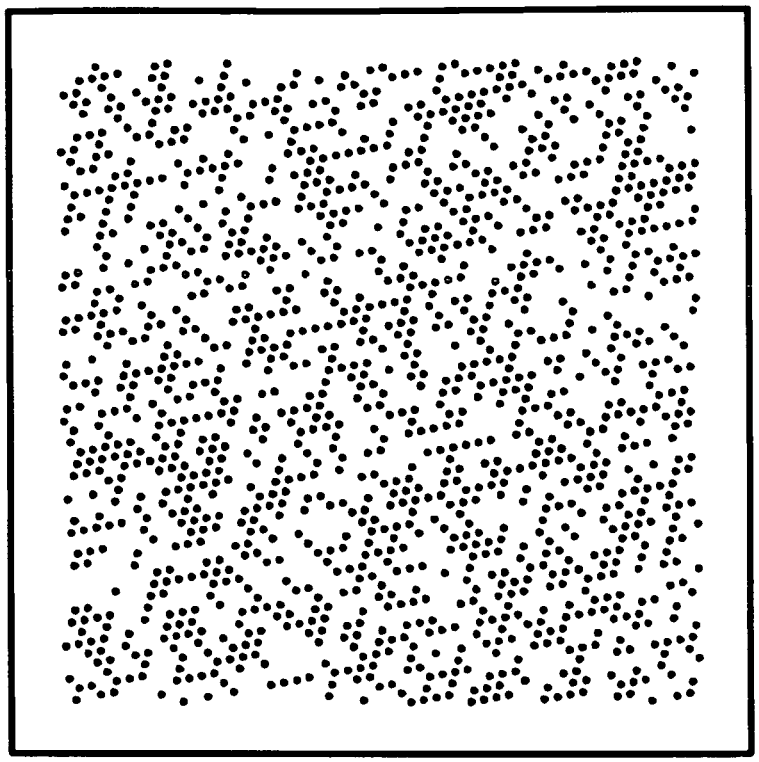
FIG. 1 shows the 2-dimensional spectral test of a generator designed by the present invention; the right plots consecutive 2-tuples of outputs as points in the square $-0.05 \leq x, y \leq 1.05$; the generator comprises the composite modulus $d=2867=47\times 61$, the multiplier $z=1298\equiv 29U_1+17U_2 \bmod(2867)$ and the initial value $n=1$ with the period $T=1380$; the left plot shows the corresponding consecutive two tuples of quotients, in the division process of the irreducible fraction $n/d$ to base $z$, which are divided by $z$ to be normalize to the interval $[0,1)$.
Figure 1:
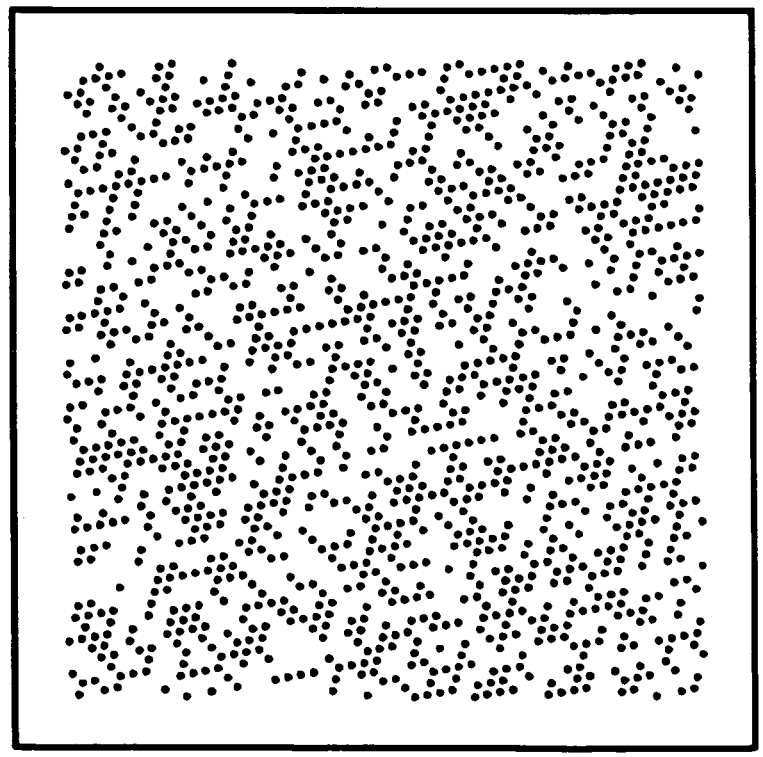
Figure 2:
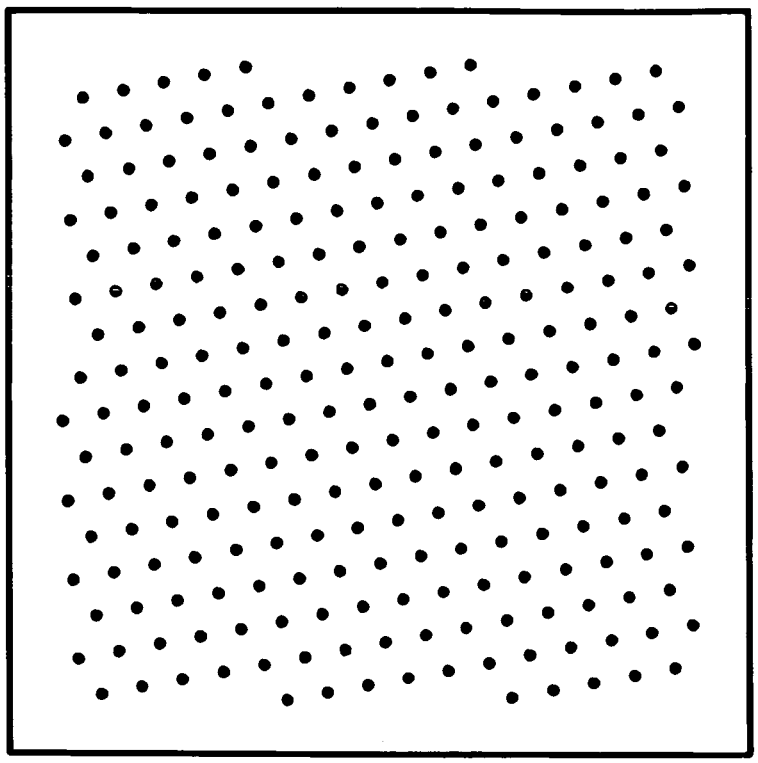
FIG. 2 shows the same setting as FIG. 1 by a generator of the prior art; prime modulus $d=p=251$, primitive root $z=162$, and $T=p-1=250$ for the period.
Figure 2:
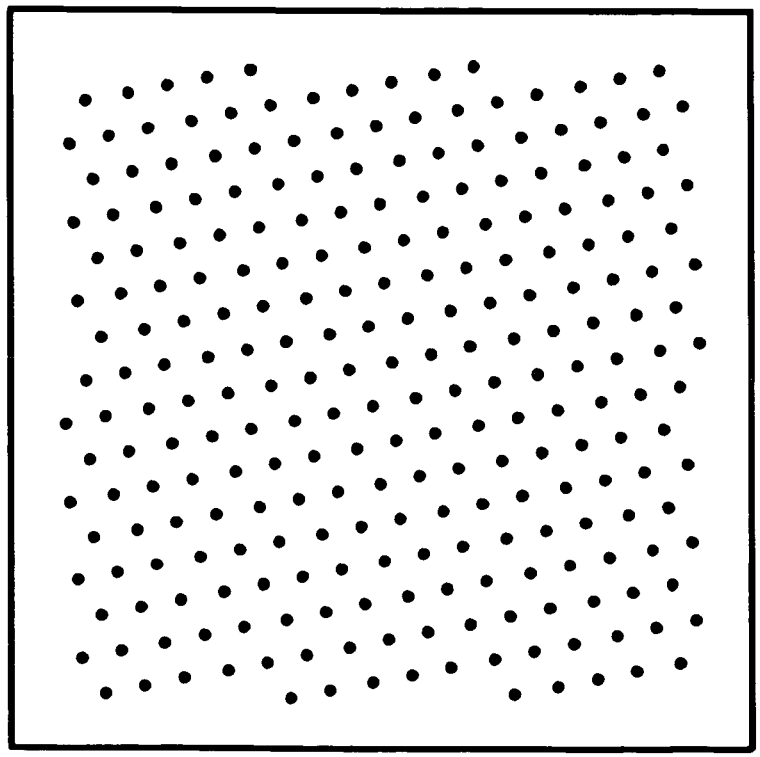
Figure 3:
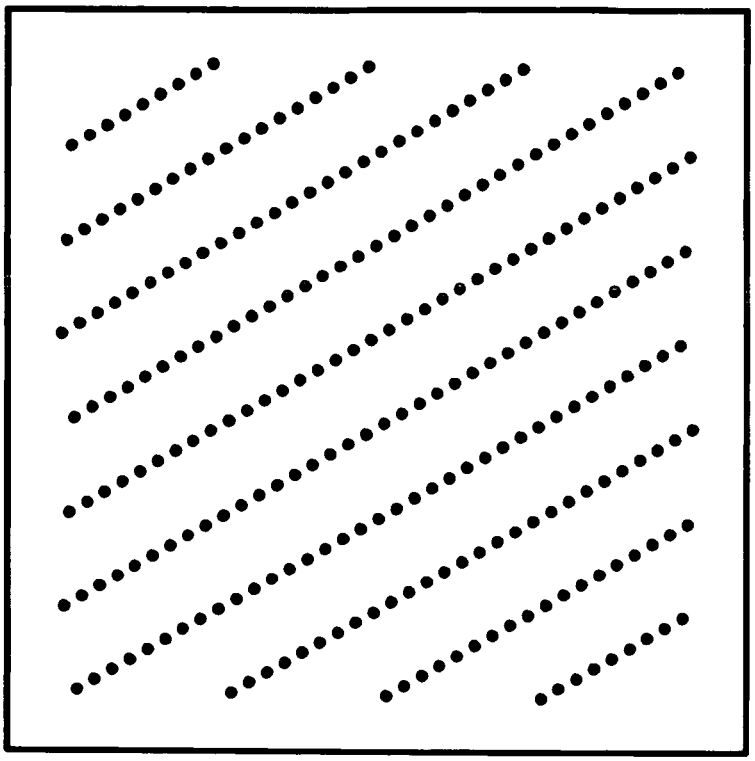
FIG. 3 shows plots of FIG. 2 taken on a different primitive root multiplier $z=61$.
Figure 3:
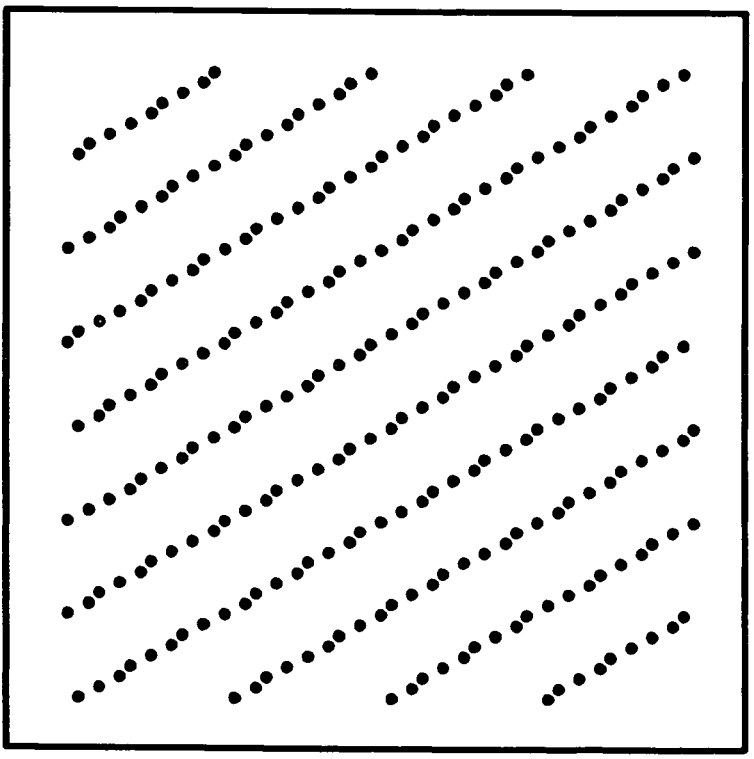
Figure 4:
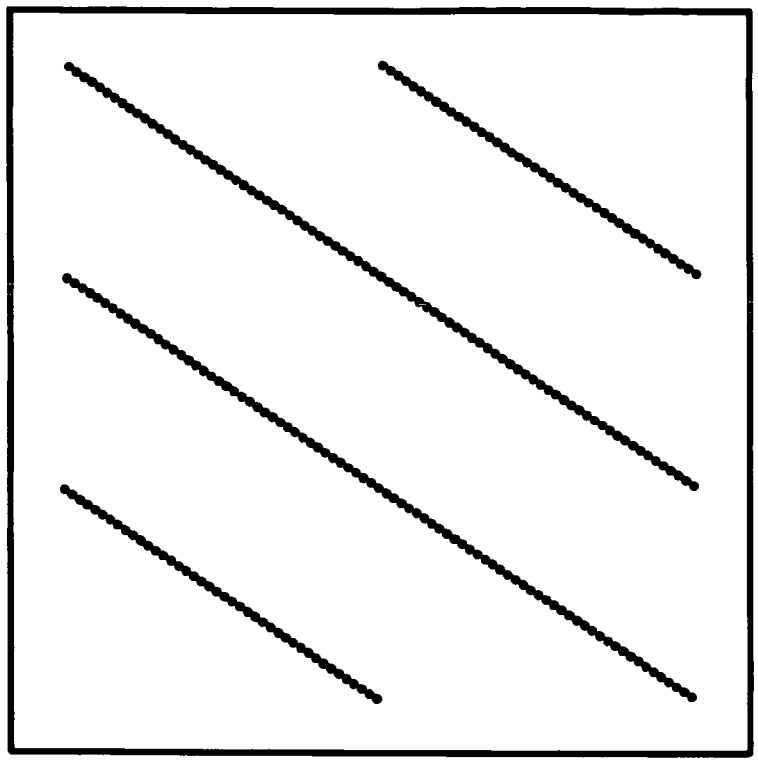
FIG. 4 shows plots of FIG. 2 taken on still another primitive root multiplier $z=127$.
Figure 4:
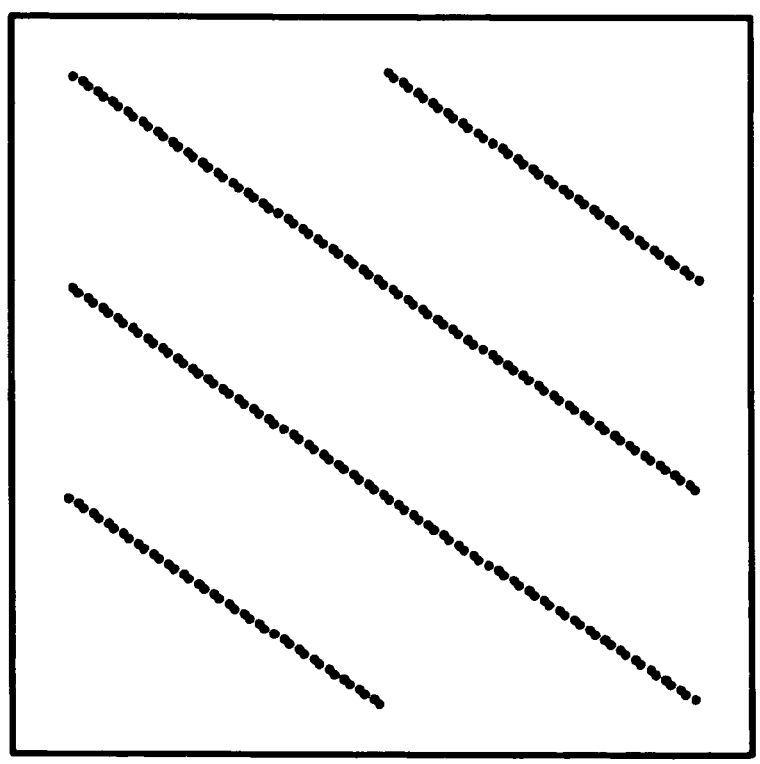
Figure 5A:
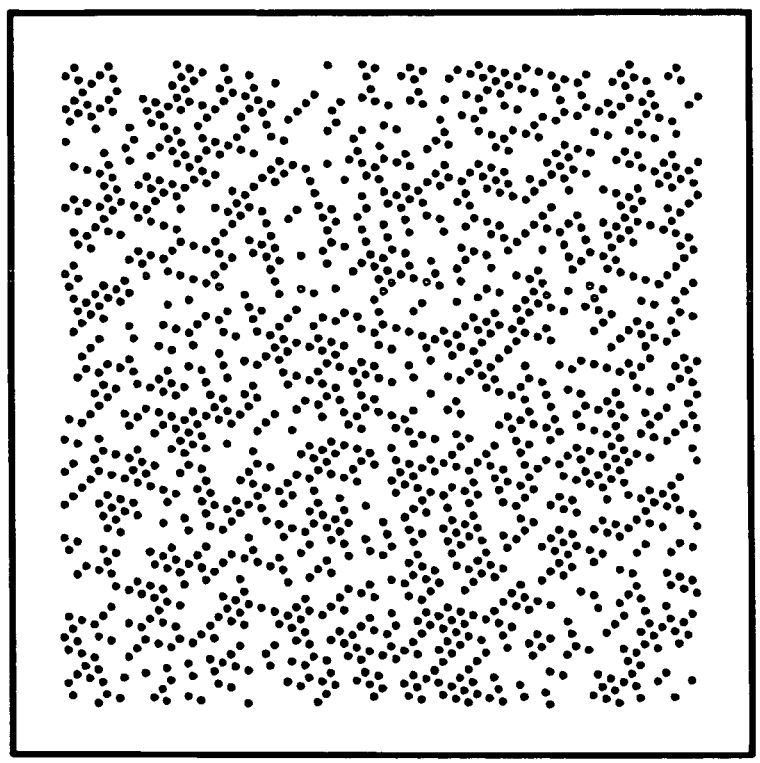
FIG. 5A shows a result of the present invention in the same setting as FIG. 1; the generator comprises the composite modulus $d=2867=47\times 61$, the multiplier $z=678\equiv-20U_1+7U_2 \bmod(2867)$ and the initial value $n=1$ with the period $T=1380$.
Figure 5A:
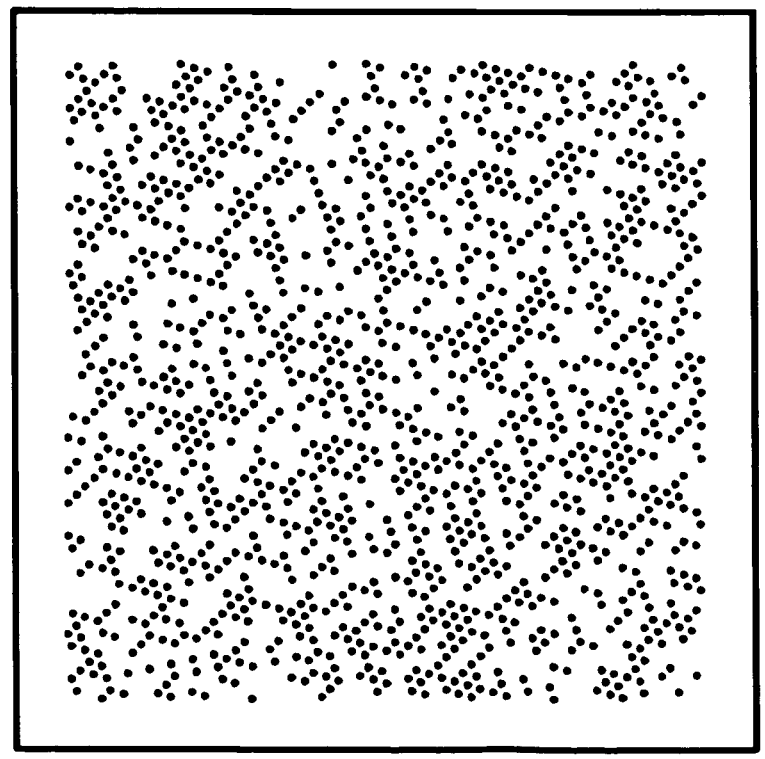
Figure 5B:
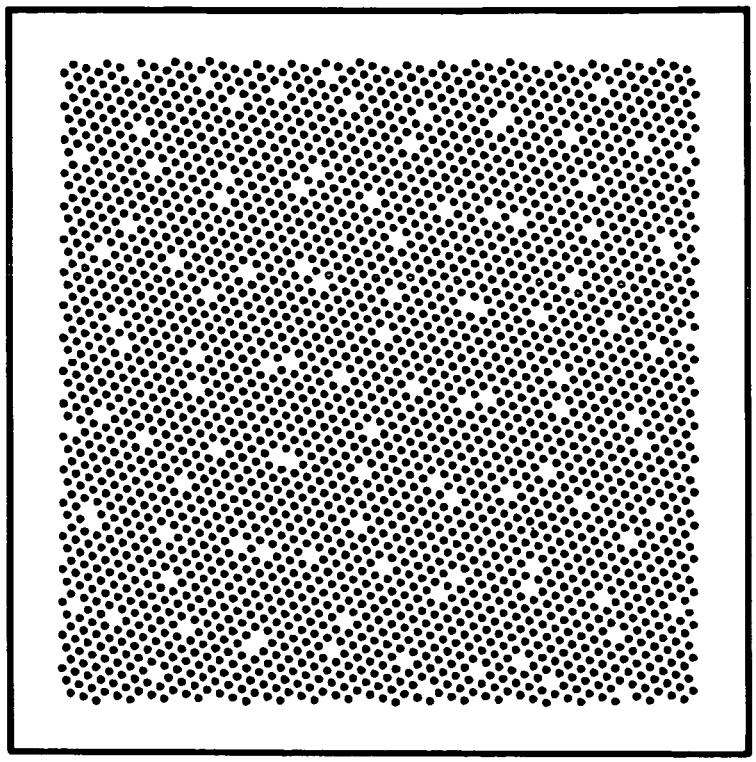
FIG. 5B shows plots of FIG. 5A with added points; the right is supplemented by points from the coset—$<z>$, and the left is added of points from the base-z numeral sequence of the irreducible fraction $-1/2867$ or rather $2866/2867$.
Figure 5B:
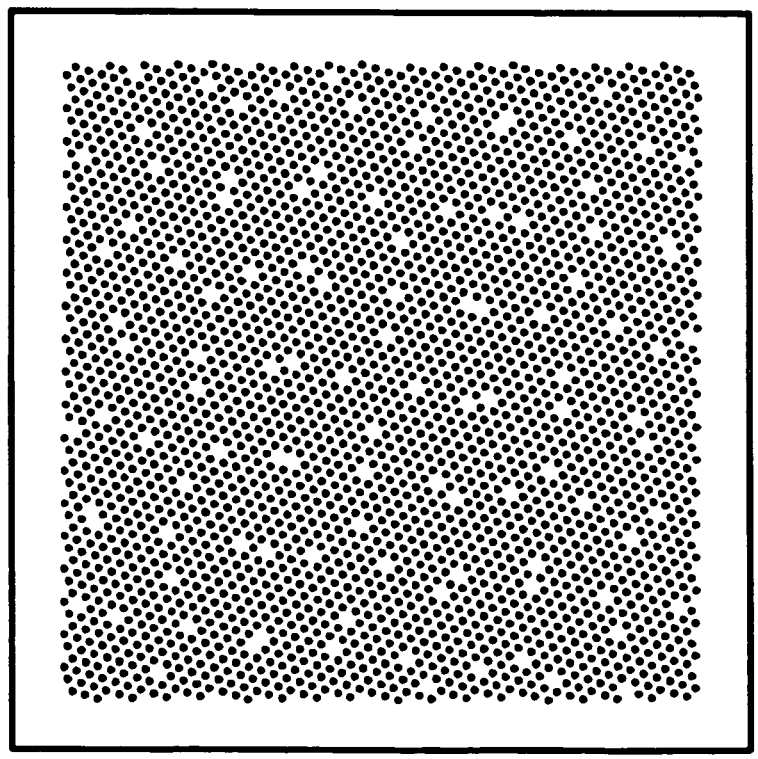

A successful case of the invention $p_1=47$ and $p_2=61$ is shown in FIG. 1 with the multiplier $z=1298\equiv 29U_1+17U_2 \bmod(2867)$. Though this is practically a toy model, the example certainly gives some measure of how large the difference $|p_1-p_2|$ should be, or how $(p_2/p_1)^{1/2}$ should be apart from 1.

As the procedure to construct the generator, the established prior art then follows to choose best primitive root multipliers, $\{z_1, z'_1, \ldots\}$ of the prime $p_1$ and $\{z_2, z'_2, \ldots\}$ of the prime $p_2$, by exhaustive spectral tests of 6-th degree. The list shown below, $$\overline{\lambda}_d^{(2)}=2^{-1/2}3^{1/4}d^{1/2}=0.930605d^{1/2},$$

$$\overline{\lambda}_d^{(3)}=2^{-1/6}d^{2/3}=0.890899d^{2/3},$$

$$\overline{\lambda}_d^{(4)}=2^{-1/4}d^{3/4}=0.840896d^{3/4},$$

$$\overline{\lambda}_d^{(5)}=2^{-3/10}d^{4/5}=0.812252d^{4/5},$$

$$\overline{\lambda}_d^{(6)}=2^{-1/2}3^{1/12}d^{5/6}=0.774899d^{5/6},$$

reproduces the smallest values $\overline{\lambda}_d^{(l)}$ realized by geometrically ideal lattices, typically the triangular lattice in the plane, with a normalization adapted for the computation with lattice and dual lattice vectors of integer components to be given shortly. The largest distance between neighboring hyperplanes containing $l-1$ linearly independent lattice vectors can have only larger values than listed above, in respective Euclidean space $E_l$ of l-dimension. Once these exhaustive spectral tests are done, say in accordance with the criterion adopted by Fishman and Moore (1986), we need to find the multiplier $z\in Z^*_{p_1 p_2}$ as the solution, unique modulo $d=p_1 p_2$, of congruence relations $$z\equiv z_1 \bmod(p_1), \; z\equiv z_2 \bmod(p_2), \; 0<z<d=p_1 p_2.$$

The procedure of solution given by Chinese remainder theorem may be briefed as follows.

1. Find integers A, B that give the identity $1=p_1 A+p_2 B$ by Euclidean algorithm, and put $U_1\equiv p_2 B \bmod(p_1 p_2)$, $U_2\equiv p_1 A \bmod(p_1 p_2)$.
2. Compute z by the congruence relation $z\equiv z_1 U_1+z_2 U_2 \bmod(d=p_1 p_2)$ in the interval $(0, d)$.

The final work is to perform the spectral test, up to the appropriate degree l, on the multiplier z in the group $Z^*_d$ with the composite modulus $d=p_1 p_2$. The procedure is the same as in prior art, but some exposition will be in order. The aim is to obtain the largest distance $\lambda_d^{(l)}(z)$ between the neighboring lattice hyperplanes determined by d, z and l. Given a possibly composite modulus $d>0$, a multiplier $z\in Z^*_d$ and $l=2, 3, \ldots$ for the dimension, the spectral test examines the lattice which may be regarded to be spanned by the following bases or basis vectors, $$e_1=(1,z,z^2,\ldots,z^{l-1}),$$

$$e_2=(0,d,0,\ldots,0),$$

$$e_3=(0,0,d,\ldots,0),$$

$$\ldots$$

$$e_l=(0,0,0,\ldots,d).$$

The lattice itself is the set of vectors formed by all of linear combinations of these basis vectors with integer coefficients. Since these are manifestly linearly independent and any integral multiples of $e_2, e_3, \ldots, e_l$ may be added to $e_1$ without destroying this linear independence, the first basis vector $e_1$ may be taken in the sense of modulo d, though we proceed as above. Let $C_l(d)$ denote the hypercube of $E_l$ whose coordinates are all in the interval [0, d). For any lattice vector to be in $C_l(d)$ the first coordinate requires that the coefficient $c_1$ of $e_1$ should be among $0, 1, \ldots, d-1$. Upon assignment of one of these d values to $c_1$, the coefficient $c_j$ of $e_j$ for $2 \leq j \leq l$ is determined uniquely by the requirement that $c_1 z^{j-1} + c_j d$ is in the interval [0, d). There exist thus d lattice points (or seats for the l-tuples of numbers from n<z>) in the hypercube $C_l(d)$, irrespective of l. It may also be noted that the hyper parallelepiped, so to say, spanned by basis vectors has the volume (corresponding to the determinant obtained by arranging basis vectors in rows) $d^{l-1}$, which is another way of saying that there are d lattice points in $C_l(d)$ of volume $d^l$. For a given set of numbers d, $z \in Z^*_d$ and $l=2, 3, \ldots$, the aim of the l-dimensional spectral test is to search the largest distance between neighboring (l-1)-dimensional hyperplanes that contain the same set of l-1 linearly independent lattice vectors. The problem is transformed tractably by the use of dual lattice (or reciprocal lattice of solid state physics) spanned by its basis vectors $$f_1=(d,0,0,\ldots,0),$$

$$f_2=(-z,1,0,\ldots,0),$$

$$f_3=(-z^2,0,1,\ldots,0),$$

$$\ldots$$

$$f_l=(-z^{l-1},0,\ldots,1),$$

which give characteristic inner products with lattice basis vectors as follows:

$$(e_j,f_k)=d\delta_{jk}, 1\leq j, k\leq l.$$

The setting reveals that the problem is identical with the spectral test for a primitive root multiplier z for an odd prime modulus p, if only we replace p with d and translate the distribution of points from <z> to that of their seats. We thus need to find the length $|f|_{min}$ of the shortest vector with nonvanishing length in the dual lattice, which gives $\lambda_d^{(l)}(z)=d/|f|_{min}$. In short, the spectral test of the present generalized setting is completely the same with the prior art for primitive root multipliers of odd prime moduluses.

If z turns out to be unsatisfactory in the closeness of its $\lambda_d^{(l)}(z)$ to the theoretical optimum $\bar{\lambda}_d^{(l)}$, different choices of component multipliers should be tried and the test need be repeated. If the result is passable, we have a design of the uniform and independent random number generator with the modulus $d=p_1 p_2$ and the multiplier z with the period $T=2q_1 q_2$.

The computability of spectral test is a difficult problem. Some rough estimates were discussed in Addendum of Nakazawa and Nakazawa (2008b). The core of spectral tests is in the preparatory procedure to find a small length L of the dual vector formed by linear combinations of integral multiples of dual basis vectors using, typically, Schmidt orthogonalization. Once this is done giving a small enough L, the spectral test needs to take only dual lattice vector $f=(a_1, a_2, \ldots, a_l)$ in Cartesian coordinates fulfilling the condition $$a_1+a_2z+a_3z^2+\ldots+a_lz^{l-1}\equiv 0 \bmod(d), |a_j|\leq L, 1\leq j\leq l.$$

Namely, the test sifts all vectors filling the above restriction out of $(2L+1)^l/2$ candidates, computes their lengths, sorts out the shortest $|f|_{min}$ of such lengths, and gives finally the valuation $\bar{\lambda}_d^{(l)}(z)=d/|f|_{min}$. The computational load of this whole process will be hard to be measured quantitatively. However, we know for certain that at present an exhaustive spectral test of $d\cong 2^{48}$ will be possible. If the present invention is to be applied to this case, then odd primes $p_1, p_2$ of the order of $2^{25}$ in magnitude, say, should be chosen and exhaustive spectral tests on their primitive roots should be performed. These are easily realized now, and we need to perform several spectral tests on the combined modulus $d=p_1 p_2$, which is certainly computable again. The computational economy to be realized by the present invention will be manifest, together with the extensibility of attainable period T. See Addendum of Nakazawa and Nakazawa (2008b) for detailed arguments. Fishman and Moore (1986) notes that the best primitive root showed the score of 120.21% as the average of dimensions $l=2, 3, \ldots, 6$. This will give us an indication how far we should or could proceed.

Figure 7A:
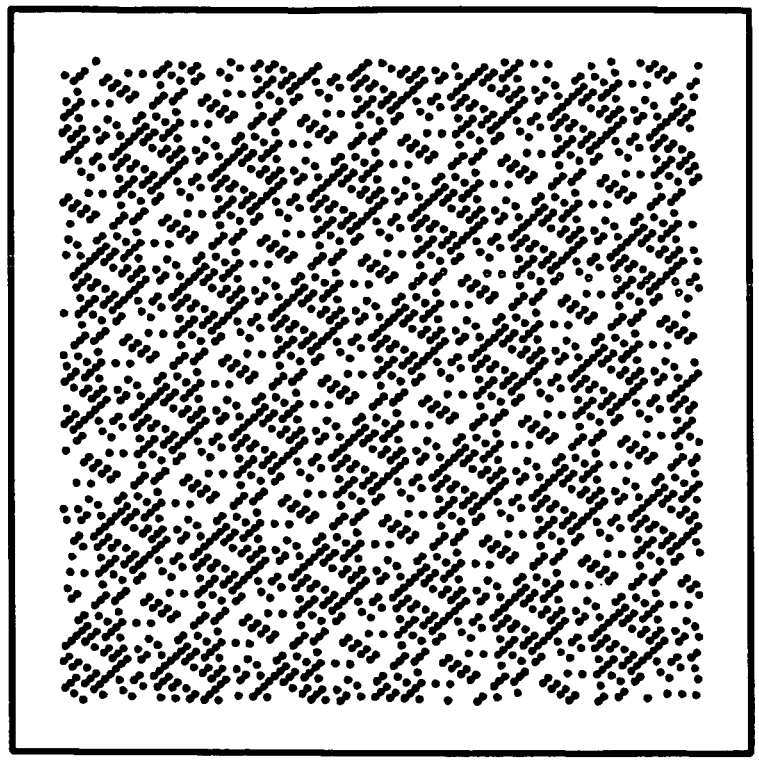
FIG. 7A shows another failure occurring with the composite modulus $d=2^i p$ with odd prime $p$; $d=21248=83\times 2^8$, $z=7461\equiv 74U_1+37U_2 \bmod(21248)$; the right shows 2-tuples from $<z>$ normalized by $1/d$, and the left shows 2-tuples from the numeral sequence to base 7461, normalized by $1/7461$, of the fraction $1/21248$.
Figure 7A:
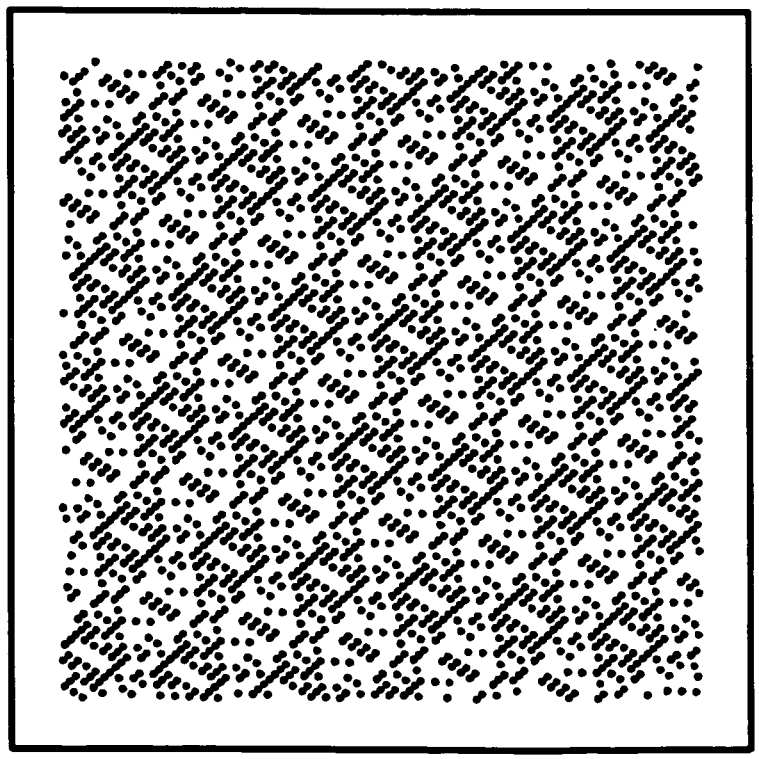
Figure 7B:
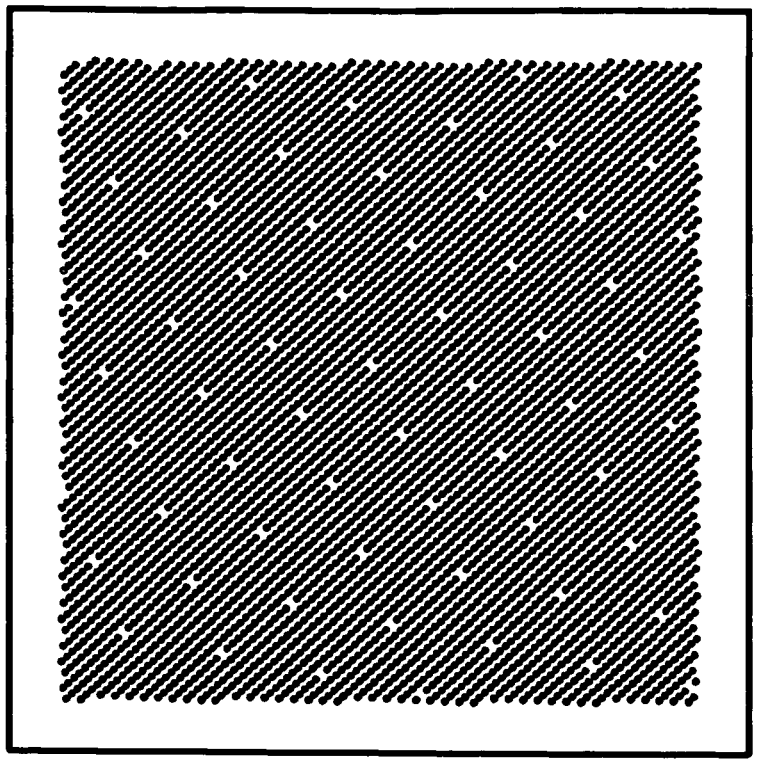
FIG. 7B shows plots of FIG. 7A with added points; the right is supplemented by points from the coset $(74^{-1}U_1+U_2)<z>$, and the left is added of corresponding points from the base-z numeral sequence of the irreducible fraction $10753/21248$.
Figure 7B:
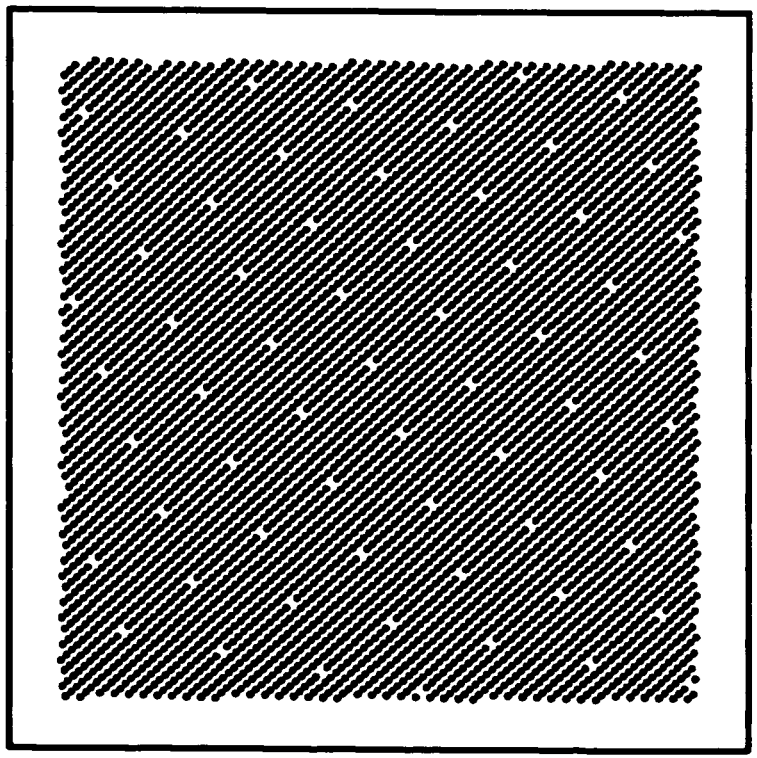

A composite modulus of the type $d=2^i d'$ with large index i and an odd d' should not be used. Though this was found, and noted in detail, in Sec. 7B of Nakazawa and Nakazawa (2008a,b), some visual information will be in order at this place. FIG. 7A takes the case $d=21248=83\times 256$, $z=7461=74U_1+37U_2 \bmod(21248)$ with the period $T=2624=41\times 64$. The right of FIG. 7A depicts 2-tuples taken from <z> for a period T. The left shows 2-tuples from the numeral sequence of the irreducible fraction 1/21248 to base $z=7461$. Patterns, or figures of correlations, are conspicuous. Nevertheless, the right of FIG. 7B, showing the plot of FIG. 7A supplemented with 2-tuples from a coset (among three) of <z> shows uncriticizably neat and regular occupation of (half of) the group $Z^*_{21248}$. The spectral test for this z and the modulus d can never detect this concealed correlation appearing in the occupation of seats by 2-tuples from <z>.

Figure 6:
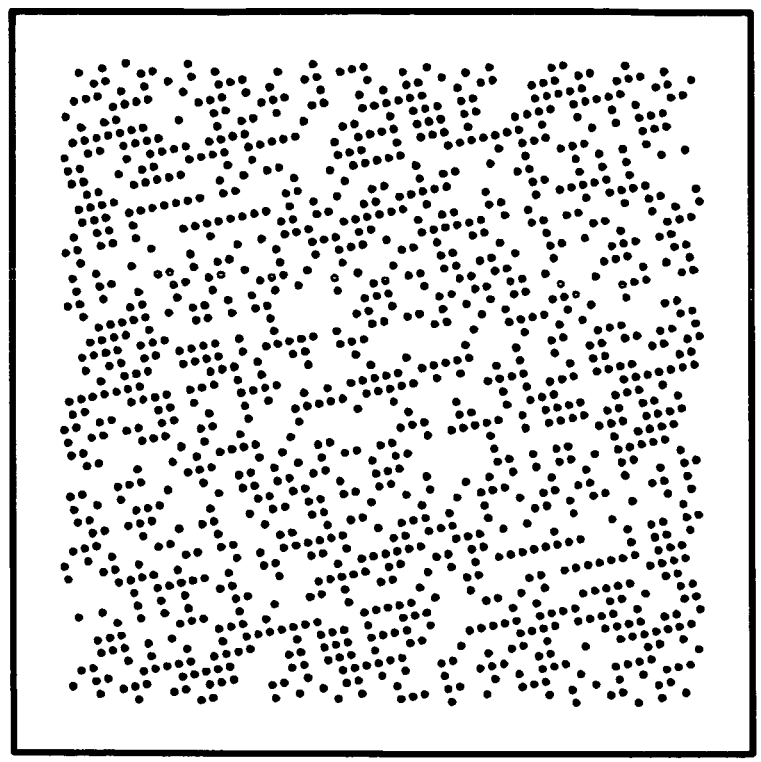
FIG. 6 gives plots for the setting out of the present invention for composite modulus $d=2537=43\times 59$, the multiplier $z=678\equiv 12U_1+13U_2 \bmod(2537)$, and with $n=1$, $T=1218$.
Figure 6:
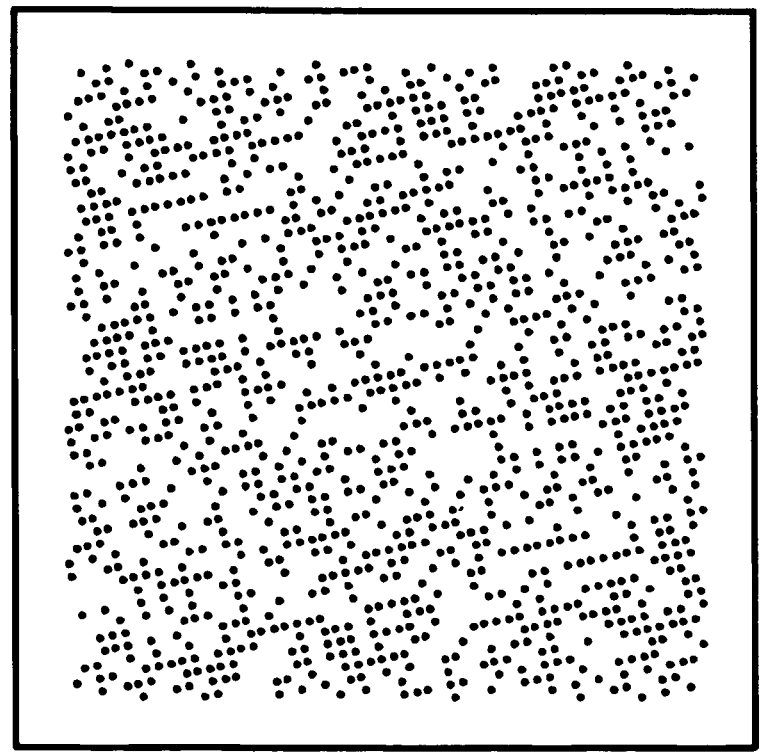

The key prescription of the invention is that one of said $\{q_1, q_2\}$ is even and the other is odd. This ensures generically that $-1\equiv d-1 \bmod(d)$ is expelled from the cyclic sequence <z>, that the whole of the sequences <z> and n<z> may be used for random numbers, and that for any $l=1, 2, 3, \ldots$ these sequences in the group $Z^*_{p_1 p_2}$ yield l-tuples of consecutive integers which, regarded as points in $E_l$, form a set devoid of improbable symmetry with respect to the center $M_d=(d/2, d/2, \ldots, d/2)$ of the hypercube in $E_l$ of sides [0, d]. In the contrary case, shown for example in FIG. 6, the cyclic subgroup <z> may be used for independent random numbers only for the half of the period, and the inferences of spectral tests on the geometrical configuration of d seats in the cube of $E_l$ considerably lose their power.

In closing, we reflect on our path through the jungle we have waded; it started from the setting of finite sequences of integers, periodic sequences, irreducible fractions, and their replacement by cyclic sequences in reduced residue class groups. We arrived at the group $Z^*_{p_1 p_2}$ for distinct odd primes $p_1, p_2$ forming the modulus, its element z for the multiplier giving the coset sequence n<z>, and the normalized coset sequence $\{v_j\}$ with period $T=\phi(p_1 p_2)/2$, $$\{v_j=r_j/d|r_1=n, r_{j+1}=zr_j \bmod(d), 0<r_j<d, 1\leq j\leq T\}.$$

Note that $\{v_j=r_j/d\}$ is not the aimed random numbers. The output should be the original sequence $\{u_j=x_j/z|1\leq j\leq T\}$ corresponding to the integer sequence $\{x_1, x_2, \ldots, x_T\}$ from which we have started. Yet, it is at once to realize this final link. The identity of the division process for n/d in numerals to base z readily gives, with the use of periodicity $v_{j+T}=v_j$ for any j, $$u_j:=x_j/z=(zr_j-r_{j+1})/(dz)=r_j/d-(r_{j+1}/d)/z=v_j-v_{j+1}/z,$$
$$1\leq j\leq T.$$

which form a set of linear transformations from $\{v_j\}$ to $\{u_j\}$. Here we remind ourselves that $v_j=r_j/d$ has so far been regarded to be defined as an irreducible fraction without any approximation, while the above noted transformations realize uniform random numbers $\{u_j\}$ that were taken as the discretization of natural random numbers with the smallest unit 1/z. We come here also to realize that the original sequence of integers $\{x_j\}$ was taken in the interval $[0, z)$ without any restrictions on the magnitude of z; it may thus happen that the irreducible fraction n/d representing the concatenated sequence of $\{x_j\}$ may have the base z larger than d, as with the case of 2/7 with its decimal sequence 0.285714 for z=10. Even if z>d is the case, the closeness of $\{u_j=x_j/z\}$ to $\{v_j=r_j/d\}$ within 1/z holds true. But the relation 1/z<1/d implies that the sequence $\{u_j\}$ traces properties of the normalized coset sequence $\{v_j\}$. Thus, 0 can never arise in $\{u_j\}$, or duplicated values can never occur in the original sequence $\{x_j\}$. If the given sequence of integers $\{x_j\}$ in the interval $[0, z)$ happens to give an irreducible fraction n/d with d smaller than z, the sequence should be discarded as inadequate for uniform and independent random numbers. We should tighten starting assumptions: The upper bound z of integers $x_1, x_2, \ldots, x_T$ should fulfill $0<z<d$ in the result of the representation by an irreducible fraction x=n/d. Since this is a natural and usual premise set at starting the search for a good sequence $\{u_j\}$ by spectral tests of multiplicative congruential generators, there arises no practical problem. Usual practices tell us that a good multiplier z<d has the magnitude $d^{1/2}$ or larger, which may be interpreted that its multiplication on the preceding integer $r_j$ should give $r_{j+1}=zr_j>d$ to be pulled back modulo d with sufficient frequency. This gives an empirical rule that good random number sequence should be realized with z fulfilling $1>>1/z\cong1/d^{1/2}>>1/d$. Now that $v_j=r_j/d$ is in effect the discretization in unit of 1/d, the use of these $\{v_j\}$ in the transformation $u_j=v_j-v_{j+1}/z$ is excessive in precision. It is then all natural to discard the term $-v_{j+1}/z$. In order to avoid confusion we denote $\{v'_j\}$ for the representation of $\{v_j\}$ in the smallest unit $\in$, obtained by truncating and rounding off $v_j=r_j/d$. The choice of $\in\cong1/z$ makes the term $-v'_{j+1}/z$ irrelevant, and we may use $\{v'_j\}$ itself as the approximation of $\{u_j\}$ within small errors of the order of 2/z, say. This is not only a simple and economical way, but also realizes the range [0, 1] for $\{u'_j:=v'_j\}$ by $1/d\leq v_j=r_j/d\leq1-1/d$. It notably admits the appearance of duplicated values in one period T of $\{u'_j=v'_j\}$ reproducing a natural property of random numbers in the original sequence $\{u_j\}$, but not in $\{v_j\}$. Last but not least, the valuations of spectral tests on $\{v_j\}$ are inherited also by $\{u'_j=v'_j\}$, just as by the exact $\{u_j\}$.

We thus recommend in the present invention the use of said $\{v'_j\}$, with the smallest unit of values taken as $\in\cong1/z$ or smaller, as the most economical and natural method of generating uniform and independent random numbers. We note that all of FIGS. 1-8 show points generated by $\{u_j=v_j-v_{j+1}/z\}$ and $\{v_j\}$ with units far smaller than 1/d. Plots corresponding to $\{u'_j=v'_j\}$ will have point configurations which are within the range of 3/z from those in the right plots. Comparisons of right and left plots with differences of 1/z will convince us that the direct use of $\{v'_j\}$ for $\in\cong1/z$ will suffice for a practical use. Even a larger choice of E may well be taken, if the structure of the generator is hoped to be more concealed to users; but an excessively large E may weaken the power of spectral test valuations.

The present invention is believed to have found a remedy of faults in primitive root multiplicative congruential generators and devices to realize more economical spectral tests, together with general theoretical prospects on uniform and independent random number problems. We advocate ways suggested in Nakazawa and Nakazawa (2008b) to extend the period of random number sequences with tested statistical properties. Structures found might well be said rich and significant, but many problems are certainly left unclarified. Learning many pitfalls met in the history of random number theory, we hope in earnest that this survey is free from any such pitfalls. Contributions are waited for from people in various fields, in presenting excellent multipliers they find for their own rights along with the progress of computers, as well as in giving still new methods realizing excellent uniform and independent random numbers.

What is claimed is:

1. A system for debugging a simulation program on a computer, the system comprising:

a processor for calculating a random number sequence using the steps of:

taking two distinct odd primes $p_1$, $p_2$ in such a way that integers $$q_1:=(p_1-1)/2, q_2:=(p_2-1)/2$$

are mutually coprime with one of $q_1$, $q_2$ is odd and the other is even;

taking the integer $d=p_1p_2$ as the product of said odd primes $p_1$ and $p_2$;

taking a primitive root $z_1$ modulo said odd prime $p_1$ and a primitive root $z_2$ modulo said odd prime $p_2$;

constructing the sequence of integers $\{r_1, r_2, r_3, \ldots\}$ by realizing recursive congruence relations $$r_1\equiv n\bmod(d), r_{k+1}\equiv zr_k\bmod(d), 1\leq r_k<d, k=1,2,\ldots$$

for an arbitrarily given initial value n coprime with said d, where z is determined modulo d uniquely by congruence relations $$z\equiv z_1\bmod(p_1), z\equiv z_2\bmod(p_2);$$

obtaining the sequence $\{v_1, v_2, \ldots\}$ by realizing the arithmetic $$v_k=r_k/d, k=1,2,3,\ldots;\text{ and}$$

outputting $\{v_1, v_2, v_3 \ldots\}$ as the aimed sequence for uniform and independent random numbers, wherein the multiplicative congruential random number generator (d; z) defined by said modulus d and said multiplier z shows 2nd degree and 3rd degree spectral test performances, which is the same as that two dimensional vectors of the form $v=(j_1,j_2)$ with integer coordinates fulfilling $$j_1+zj_2\equiv 0\bmod(d)$$

and with non-zero length $\|v\|=(j_1^2+j_2^2)^{1/2}>0$ have their shortest vector $v_{min}$ with the property $$\|v_{min}\|>2^{1/2}d^{1/2}/(1.25\times3^{1/4})$$

and as that three dimensional vectors of the form $v=(j_1, j_2, j_3)$ with integer coordinates fulfilling $$j_1+zj_2+z^2j_3\equiv 0\bmod(d)$$

and with non-zero length $\|v\|=(j_1^2+j_2^2+j_3^2)^{1/2}>0$ have their shortest vector $v_{min}$, with the property $$\|v_{min}\|>2^{1/6}d^{1/3}/1.25; \text{ and}$$

a memory that stores a simulation program suitable for operation on a computer, wherein the calculated random number is reproducible and transportable allowing for debugging, via the processor, the simulation program stored in memory, and saving the debugged simulation in the memory.

2. The system of claim 1, further comprising a simulatable element that is simulated using the saved debugged simulation program stored in memory.

3. A method of debugging a simulation program on a computer using a reproducible and transportable random number sequence, the method comprising:

identifying a simulation program stored in memory that needs to be debugged;

debugging the simulation program via a processor using the processor to generate at least one reproducible and transportable random number sequence by:

taking two distinct odd primes $p_1$, $p_2$ in such a way that integers $$q_1:=(p_1-1)/2, \, q_2:=(p_2-1)/2$$

are mutually coprime with one of $q_1$, $q_2$ is odd and the other is even;

taking the integer $d=p_1p_2$ as the product of said odd primes $p_1$ and $p_2$;

taking a primitive root $z_1$ modulo said odd prime $p_1$ and a primitive root $z_2$ modulo said odd prime $p_2$;

constructing the sequence of integers $\{r_1, r_2, r_3, \ldots\}$ by realizing recursive congruence relations $$r_1 \equiv n \bmod(d), \, r_{k+1} \equiv zr_k \bmod(d), \, 1 \leq r_k < d, \, k=1,2,\ldots$$

for an arbitrarily given initial value n coprime with said d, where z is determined modulo d uniquely by congruence relations $$z \equiv z_1 \bmod(p_1), z \equiv z_2 \bmod(p_2);$$

obtaining the sequence $\{v_1, v_2, \ldots\}$ by realizing the arithmetic $$v_k = r_k/d, \, k=1,2,3,\ldots; \text{ and}$$

outputting $\{v_1, v_2, v_3 \ldots\}$ as the aimed sequence for uniform and independent random numbers, wherein the multiplicative congruential random number generator (d; z) defined by said modulus d and said multiplier z shows 2nd degree and 3rd degree spectral test performances, which is the same as that two dimensional vectors of the form $v=(j_1,j_2)$ with integer coordinates fulfilling $$j_1+zj_2 \equiv 0 \bmod(d)$$

and with non-zero length $\|v\|=(j_1^2+j_2^2)^{1/2}>0$ have their shortest vector $v_{min}$ with the property $$\|v_{min}\|>2^{1/2}d^{1/2}/(1.25\times 3^{1/4})$$

and as that three dimensional vectors of the form $v=(j_1, j_2, j_3)$ with integer coordinates fulfilling $$j_1+zj_2+z^2j_3 \equiv 0 \bmod(d)$$

and with non-zero length $\|v\|=(j_1^2+j_2^2+j_3^2)^{1/2}>0$ have their shortest vector $v_{min}$, with the property $$\|v_{min}\|>2^{1/6}d^{1/3}/1.25; \text{ and}$$

storing the debugged simulation program in memory.

4. The method of claim 3, comprising simulating an element that is simulated using the saved debugged simulation program stored in memory.

* * * * *